US006972972B2

(12) United States Patent
Duncan et al.

(10) Patent No.: US 6,972,972 B2
(45) Date of Patent: Dec. 6, 2005

(54) POWER INVERTER WITH OPTICAL ISOLATION

(75) Inventors: Paul G. Duncan, Vienna, VA (US); John Alan Schroeder, Leesburg, VA (US)

(73) Assignee: Airak, Inc., Manassas, VA (US)

( * ) Notice: Subject to any disclaimer, the term of this patent is extended or adjusted under 35 U.S.C. 154(b) by 212 days.

(21) Appl. No.: 10/413,570

(22) Filed: Apr. 15, 2003

(65) Prior Publication Data

US 2004/0024937 A1 Feb. 5, 2004

Related U.S. Application Data

(60) Provisional application No. 60/372,120, filed on Apr. 15, 2002.

(51) Int. Cl.[7] .................................................. H02H 7/122
(52) U.S. Cl. ..................................... 363/56.01; 363/131
(58) Field of Search ......................... 363/50, 55, 56.01, 363/56.03, 56.05, 131

(56) References Cited

U.S. PATENT DOCUMENTS 5,181,026 A * 1/1993 Granville ............... 340/870.28
6,700,802 B2 * 3/2004 Ulinski et al. ................ 363/37

* cited by examiner

*Primary Examiner*—Adolf Berhane
(74) *Attorney, Agent, or Firm*—Greenberg Traurig, LLP; Richard E. Kurtz, II

(57) ABSTRACT

An optically isolated power electronic power conversion circuit that includes an input electrical power source, a heat pipe, a power electronic switch or plurality of interconnected power electronic switches, a mechanism for connecting the switch to the input power source, a mechanism for connecting comprising an interconnecting cable and/or bus bar or plurality of interconnecting cables and/or input bus bars, an optically isolated drive circuit connected to the switch, a heat sink assembly upon which the power electronic switch or switches is mounted, an output load, a mechanism for connecting the switch to the output load, the mechanism for connecting including an interconnecting cable and/or bus bar or plurality of interconnecting cables and/or output bus bars, at least one a fiber optic temperature sensor mounted on the heat sink assembly, at least one fiber optic current sensor mounted on the load interconnection cable and/or output bus bar, at least one fiber optic voltage sensor mounted on the load interconnection cable and/or output bus bar, at least one fiber optic current sensor mounted on the input power interconnection cable and/or input bus bar, and at least one fiber optic voltage sensor mounted on the input power interconnection cable and/or input bus bar.

20 Claims, 34 Drawing Sheets

Measured/Calculated Parameters:

$E_{on} = 0.56J$
$E_{off} = 0.30J$
$E_{sw} = 0.86\ J$
$P_{5kHz} = 4.3\ kW$

Measured/Calculated Parameters:

$E_{on}$ = 1.05J
$E_{off}$ = 0.53J
$E_{sw}$ = 1.58 J
$P_{5kHz}$ = 7.9 kW

Measured/Calculated Parameters:

$E_{on}$ = 1.88J
$E_{off}$ = 0.86J
$E_{sw}$ = 2.84 J
$P_{5kHz}$ = 14.2 kW

POWER INVERTER WITH OPTICAL ISOLATION

CROSS-REFERENCE TO RELATED APPLICATIONS

This application claims the benefit of U.S. Provisional Patent Application No. 60/372,120, filed Apr. 15, 2002, the entire disclosure of which is incorporated herein by reference.

This invention was made with Government support under Grant No. DE-FG02-01ER831242 awarded by the Department of Energy. The Government has certain rights in this invention.

BACKGROUND OF THE INVENTION

1. Field of the Invention

The field of this invention relates generally to power conversion technologies.

2. Description of the Related Art

Several issues are impeding state-of-the-art, next-generation advances in power conversion technologies. Among these issues are the problems associated with existing thyristor-based, multi-level converter systems and how they are applied to distributed energy resource (DER) applications. The mature versions of these designs have severe limitations due to one or more of the following:

- Slow switching speeds requires larger sized reactive compensation components (a power density and cost problem).
- The reverse bias safe operating area (RBSOA) of many thyristor-based devices is considered small (a design constraint).
- The general requirement for expensive, anti-parallel diodes across the main switching devices, which cannot withstand high rates of current change (di/dt) (a failure mode, cost, and efficiency problem).
- The general requirement for shoot-through protection, often in the form of a series inductor along with a resistive-diode for current protection, as well as some form of a voltage clamp circuit to prevent the device from over voltage failure (over voltage/current as well as cost and efficiency problems).
- Difficulties exist in separating the gate drive control section from the high voltage/high current power stage (cost and isolation problems).
- The physical size of existing systems often prevents their wide-scale deployment in space critical applications, such as those on board ship, aircraft, or spacecraft (the power density problem).
- The requirement for external deionized (DI) water cooling systems to dissipate heat due to switching losses. These systems have high life-cycle maintenance costs and reduce overall system reliability.

The list continues to expand as increasing pressure is placed upon manufacturers to deliver smaller, faster, and higher power converters for an ever-growing list of demanding applications.

BRIEF SUMMARY OF THE INVENTION

An optically isolated power electronic power conversion circuit that includes an input electrical power source, a heat pipe, a power electronic switch or plurality of interconnected power electronic switches, a mechanism for connecting the switch to the input power source, a mechanism for connecting comprising an interconnecting cable and/or bus bar or plurality of interconnecting cables and/or input bus bars, an optically isolated drive circuit connected to the switch, a heat sink assembly upon which the power electronic switch or switches is mounted, an output load, a mechanism for connecting the switch to the output load, the mechanism for connecting including an interconnecting cable and/or bus bar or plurality of interconnecting cables and/or output bus bars, at least one a fiber optic temperature sensor mounted on the heat sink assembly, at least one fiber optic current sensor mounted on the load interconnection cable and/or output bus bar, at least one fiber optic voltage sensor mounted on the load interconnection cable and/or output bus bar, at least one fiber optic current sensor mounted on the input power interconnection cable and/or input bus bar, and at least one fiber optic voltage sensor mounted on the input power interconnection cable and/or input bus bar.

BRIEF DESCRIPTION OF THE DRAWINGS

For a more complete understanding of the present invention and for further advantages thereof, reference is made to the following Detailed Description, taken in conjunction with the accompanying drawings, in which.

Figure 1:
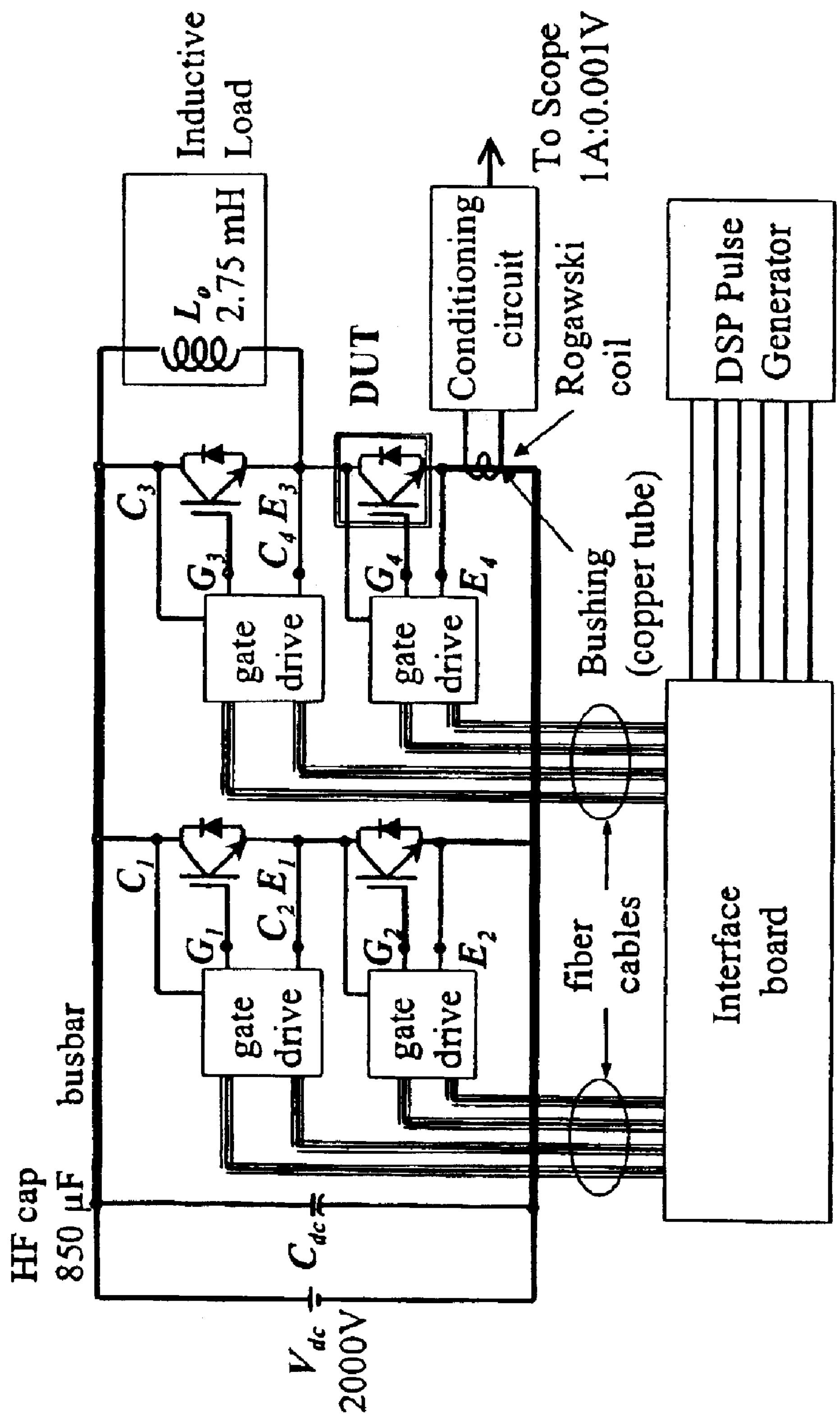
FIG. 1 illustrates an HV-IGBT device test setup.

It is to be noted, however, that the appended drawings illustrate only typical embodiments of this invention and are therefore not to be considered limiting of its scope, for the invention may admit to other equally effective embodiments.

DETAILED DESCRIPTION OF THE INVENTION

To combat the above-listed limitations of the related art, and to enable the creation of efficient, reliable, high-powered converters, a new generation of power stage technology is being developed. Specifically, these power stages are optically interconnected, are based upon the latest IGBT technologies, and use innovative self-contained cooling technologies to provide extremely compact and reliable systems. The advantages of implementing all-optical sensor and feedback schemes, when combined with all-optical gate drive control signals in high-power cascaded inverters are numerous: the high-power output stage can be completely isolated from the lower-potential input and control subsystem, resulting in higher reliability, reduced personnel hazard, and simplified gate control implementation.

The devices and methods described herebelow provide low-cost production-ready fiber optic field sensors capable of measuring tens to thousands of amperes of current, all within the same quick connect/disconnect package.

Described herebelow is a three-phase, optically isolated, five mega-watt (5 MW) cascaded multi-level inverter for DER applications. With regard to an optically-isolated HV-IGBT-based 5-MW cascaded inverter for DER applications, there are immediate benefits and longer-term benefits of research & development.

Among the immediate benefits is that movement to IGBT devices removes snubber and anti-parallel diode requirements, resulting in greater efficiency, lower cost, and higher reliability. Also among the immediate benefits is that the 3-phase inverter system occupies a smaller footprint, allowing a higher power density to be realized. This has tremendous implications for shipboard and aircraft applications. Another immediate benefits is that the proposed inverter system proves the superiority of optical sensors over conventional sensors in terms of bandwidth, control loop response time, isolation, EMI immunity, and weight. Yet another immediate benefit is intrinsic protection. For example, the proposed system offers over-current, over/under-voltage, over-temperature, and unbalanced protection. Also on the list of immediate benefit is that the proposed inverter system is intrinsically redundant due to the multi-level stacking capability as the system is increased in size.

Among the longer-term benefits is that the U.S. competitive lead will be maintained. In other words, the advances made in the areas of materials science and fiber optic sensing ensure that the U.S. remains a significant market force with respect to overseas development in crystal growth, optical sensing methods, and power electronics development. Another longer-term benefit is that the proposed fiber optic measurement subsystem can be used in DC measurement applications, such as those in the photovoltaic community, where conventional current transducers or other measurement technologies do not perform well. Yet another longer-term benefit is that the fiber optic sensor subsystem of the inverter system will allow for immediate migration of the optical technology to the electrical distribution power industry for disturbance monitoring and fault isolation applications. Yet another longer-term benefit is that the fiber optic sensor component of the inverter subsystem allows switching frequencies of power electronic modules to move higher, which reduces filter size and weight. This is significant in high power, high frequency systems, such as those on board electric cars, aircraft, industrial drives, electrical utilities, and shipboard applications. Also among the longer-term benefits is that the inherent isolation afforded with the fiber optic sensing subsystem allows for the development of highly compact feedback loops without the concerns of high-voltage or current conduction into the feedback path. Hence, the power density per unit volume of subsequent applications will continue to increase.

According to certain embodiments of the present invention, a full-bridge megawatt level inverter is disclosed. This inverter is based upon HV-IGBTs with optical sensing, interfacing, and control. According to certain other embodiments, a quick-connect/disconnect fiber optic current sensor (FOCS) is disclosed. According to yet other embodiments, the development of a new generation of sensor element that allow the measurement of voltages using optical methodologies is disclosed. According to still other embodiments, optical current sensing side-by-side with a conventional current transducer is disclosed.

To characterize the HG-IGBTs, a system shown in FIG. 1 was designed and built. The power stage is completely isolated from the control and interface circuits with fiber optic cables. A high-speed digital signal processor (DSP) is programmed to produce a two-pulse train. The first pulse allows the inductive load to establish the desired current magnitude and the second pulse allows the device to turn off the opposite side anti-paralleled diode so that the diode reverse recovery characteristic can be studied. Selected as the device under test (DUT) were Mitsubishi CM1200HB-50H high-voltage insulated-gate-bipolar-transistor (HV-IGBT) modules. Each module contains a pair of IGBTs and diodes, rated at 1200A/2500V full-scale. Due to available power supply constraints, maximum test conditions were limited to 700 A/2000V.

Optical Sensor Specifications

Based upon the configured test system, the maximum full-scale optical voltage and current measurement levels were targeted to a minimum 2500V and 2400 A respectively, to allow for the possibility of measuring overshoot in each of the waveforms.

Busbar Construction

Figure 2:
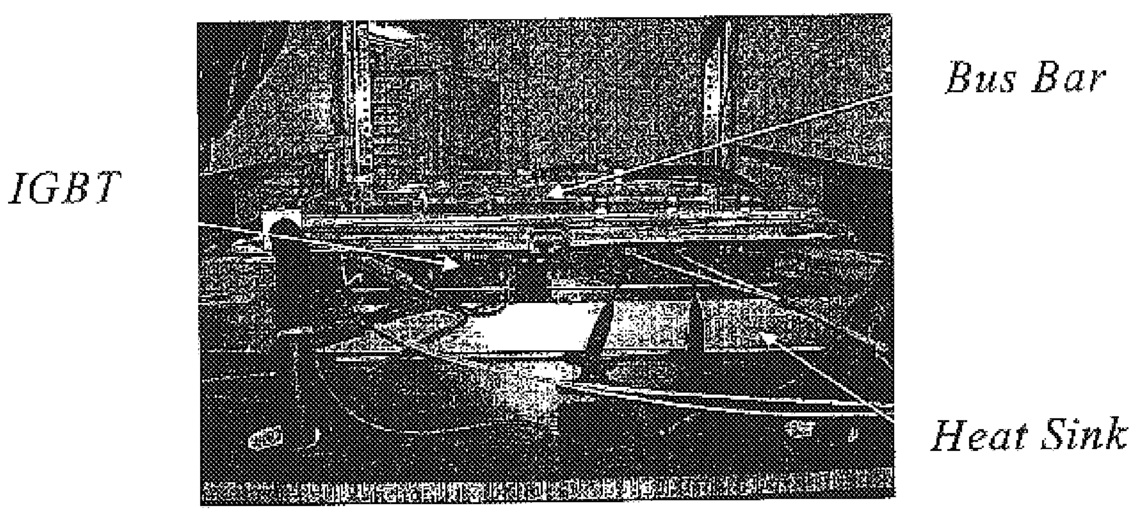
FIG. 2 illustrates a side view of the busbar/IGBT/heatsink assembly.

The HV-IGBT module assembly allows a low-leakage inductance busbar to be used. Some concerns involving high-voltage busbar design are potential insulation breakdown and fire hazard. As a result, the type of the busbar insulation material and the thickness of both insulation material and copper was taken into account. The creepage around all screw holes complied with Underwriters Laboratories Inc. (UL) standards. In the prototype design, 1⁄16"-thick Glastik™ material and 3⁄32"-thick copper sheets were used to construct the entire busbar. They provide sufficient insulation strength and current density, as well as mechanical sturdiness to avoid damage due to heavy cable termination and shipping. The assembly is shown in FIG. 2.

Gate Drive

Figure 3:
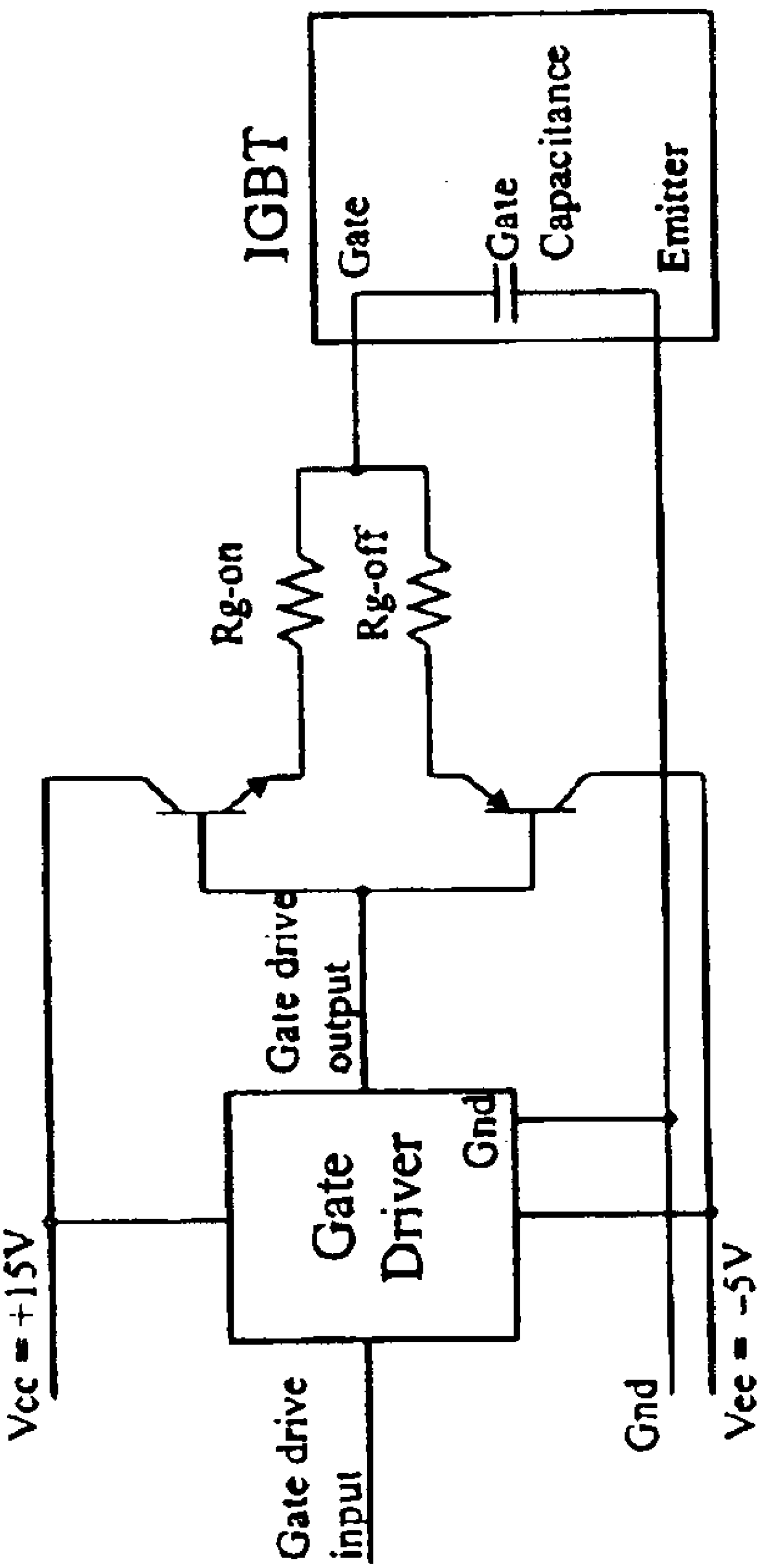
FIG. 3 illustrates a gate drive circuit for HV-IGBT.

The gate drive design is the first step to achieving proper HV-IGBT switching. FIG. 3 shows a simplified gate drive circuit describing circuit components. In general, the gate drive resistance is preferably as small as possible so that the gate current is high enough to increase the switching speed and to reduce the switching losses. The manufacturer of the switches can provide switching loss as a function of the gate resistance, but does not suggest a proper design value because it is related to the gate drive circuit layout and the associate leakage components.

Figure 4:
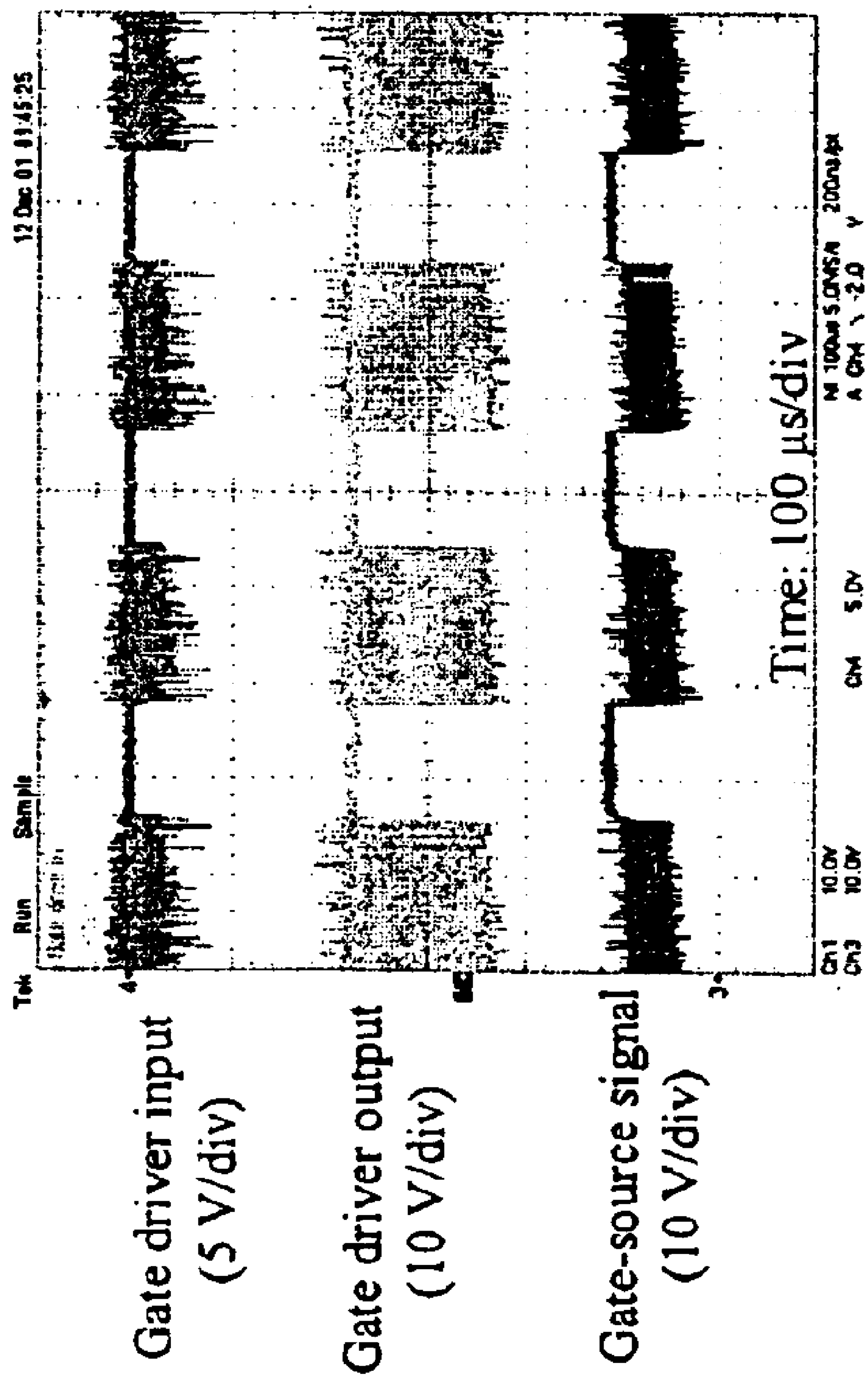
FIG. 4 illustrates gate signal oscillation due to fiber optic cable disturbance.

One of the factors in the design of the gate drive is the large gate capacitance of the device—120 nF for the selected device. When the gate turn on and turn off resistors are small, they typically do not provide enough damping in the circuit loop shown in FIG. 3 and a physical disturbance in the fiber optic cable signal that is connected to the drive starts a self sustaining oscillation, as is shown below in FIG. 4.

Figure 5:
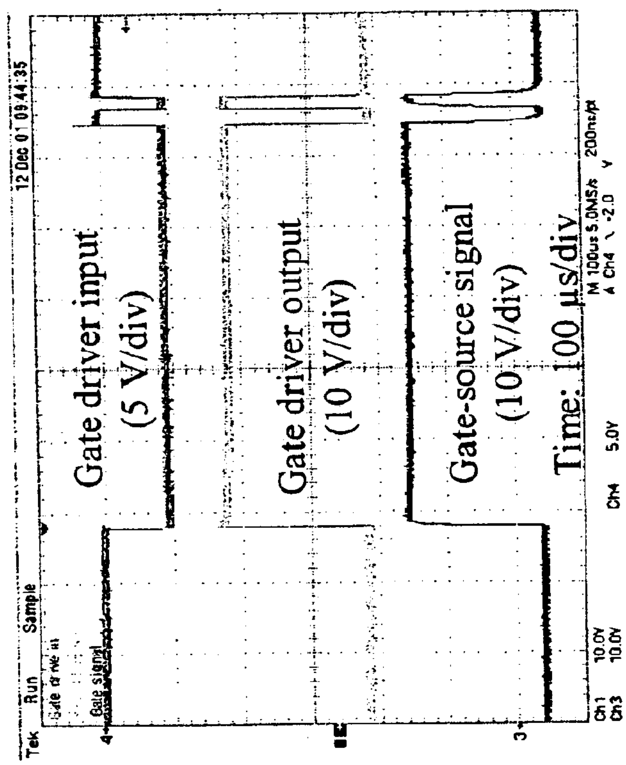
FIG. 5 illustrates normal operation of a two-pulse gate signal.

In order to avoid gate drive circuit instability, the gate turn-on resistor $R_{g\text{-}on}$ is preferably selected to be (1) large enough to damp the ringing and to reduce the noise, and (2) small enough to accelerate the turn-on process and reduce the turn-on loss. The turn-off resistor $R_{g\text{-}off}$ is preferably selected to be large enough to avoid sink-transistor over current and small enough to avoid high switching loss. With a design that takes multiple factors such as device transconductance, leakage inductance, and device capacitance, into account, a set of $R_{g\text{-}on}$ and $R_{g\text{-}off}$ values were properly selected to avoid the above-mentioned gate drive oscillation. FIG. 5 shows a representative operation of the two-pulse gate signal.

Desaturation Protection

The desaturation protection is an advantageous feature that a HV-IGBT has over thyristor devices. During testing, a variable voltage was applied across the gate drive output to measure the trip-voltage level and determine the desaturation circuit parameters. In the desaturation protection circuit, a set of high voltage diodes and resistors were designed and laid out properly with sufficient spacing requirement to comply with UL standards. After implementing the design, test results indicated that the HV-IGBT tripped at twice the rated current during a short circuit condition. This implies that the device can prevent short circuit or shoot through failure, which is not possible with other thyristor type devices.

HV-IGBT Switching Voltage and Current and Associated Energy Losses

Figure 6:
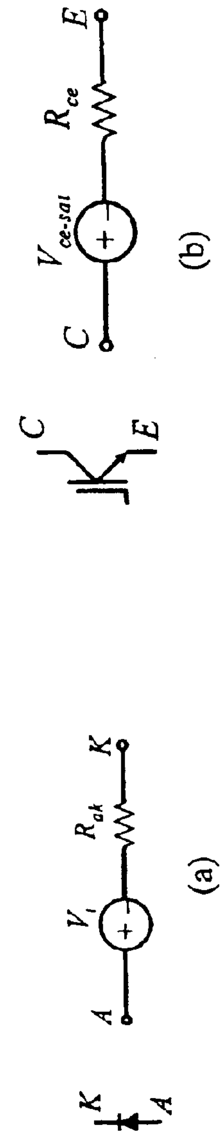
FIGS. 6(*a*) and 6(*b*) illustrate the device conduction loss model.

In order to predict the pulse-width-modulated (PWM) inverter system efficiency, the device conduction and switching losses are first found. The conduction loss can be obtained from static conducting conditions at different temperatures and can be modeled as a simple voltage source in series with a resistive voltage drop. FIG. 6 shows the circuit diagrams of the conduction loss model for (a) diode and (b) IGBT. The voltage drop across the device is a function of the device current, $V_{ce}=V_{ce\text{-}sat}+I_cR_{ce}$ and $V_{AK}=V_t+I_AR_{AK}$ where $I_c$ is the device current. At room temperature conditions, which represents the highest expected voltage drop for diode, the conduction loss model parameters are: $V_{ce\text{-}sat}=1.8V$, $R_{ce}=1\ m\Omega$ and $V_t=1.5\ V$ and $R_{ce}=0.833\ m\Omega$.

Figure 7:
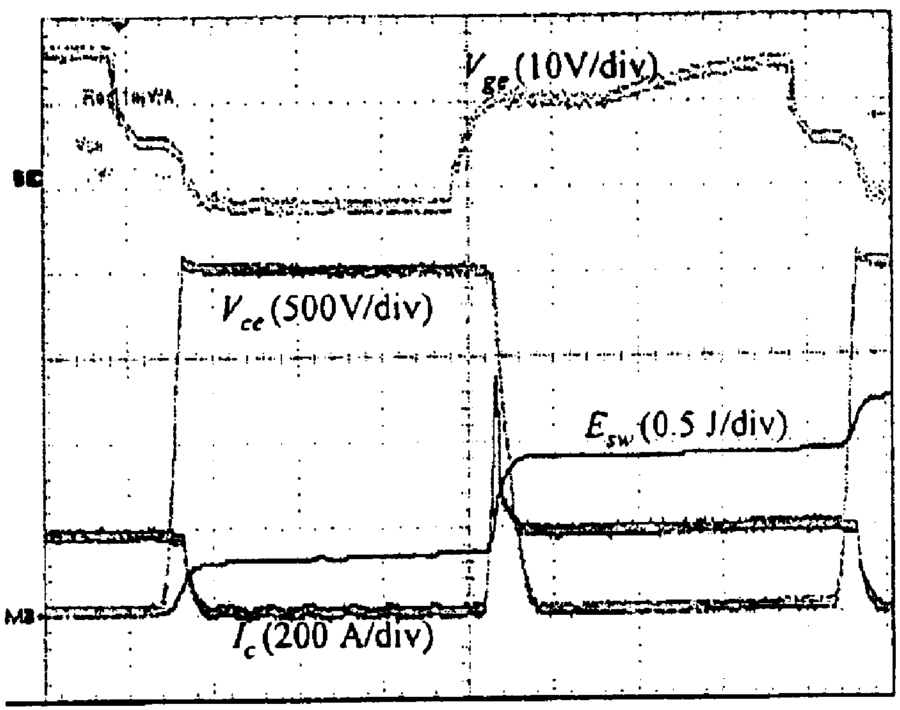
FIG. 7 illustrates an HV-IGBT switched at 2 kV, 190 A.
Figure 8:
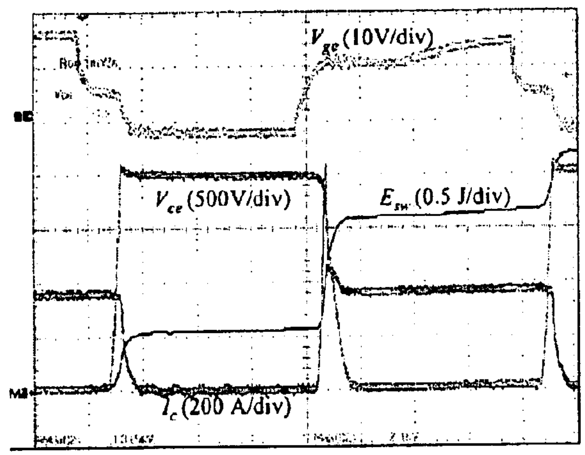
FIG. 8 illustrates an HV-IGBT switched at 2 kV, 370 A.
Figure 9:
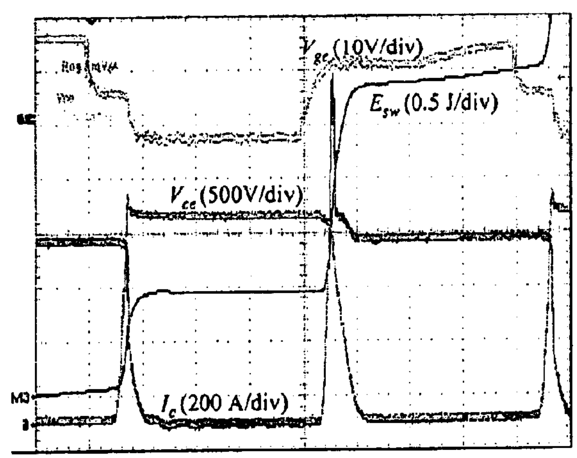
FIG. 9 illustrates an HV-IGBT switched at 2 kV, 700 A.

Although the device switching energy can be obtained from the manufacturer's datasheet, it is best to check the number with actual tests because the gate-drive parameters used by manufacturers are normally not optimized for a particular layout. The device switching energy can be obtained by integrating the product of the device voltage and current over the entire switching period. FIG. 7 through FIG. 9 show a typical switching voltage and current along with their energy waveforms.

The above switching energy measurement results were curve-fitted into a mathematical model. Using the mathematical model, the switching energy at different current conditions was projected, and the inverter PWM switching losses were then calculated based on the switching energy and switching frequency. The turn-on switching energy model can be expressed as $$E_{on}=hI_c^k[\text{joules}] \tag{1}$$

where $I_c$ is the device current, h and k are the parameters to be curve-fitted. The turn-off switching energy model can be expressed as $$E_{off}=mI_c^n[\text{joules}] \tag{2}$$

where m and n are the parameters to be curve-fitted. Through simple mathematical manipulation with the measurement results, the extracted switching energy parameters were obtained as follows:

h: 0.0021, k: 1.049, m: 0.00256, n: 0.9

Figure 10:
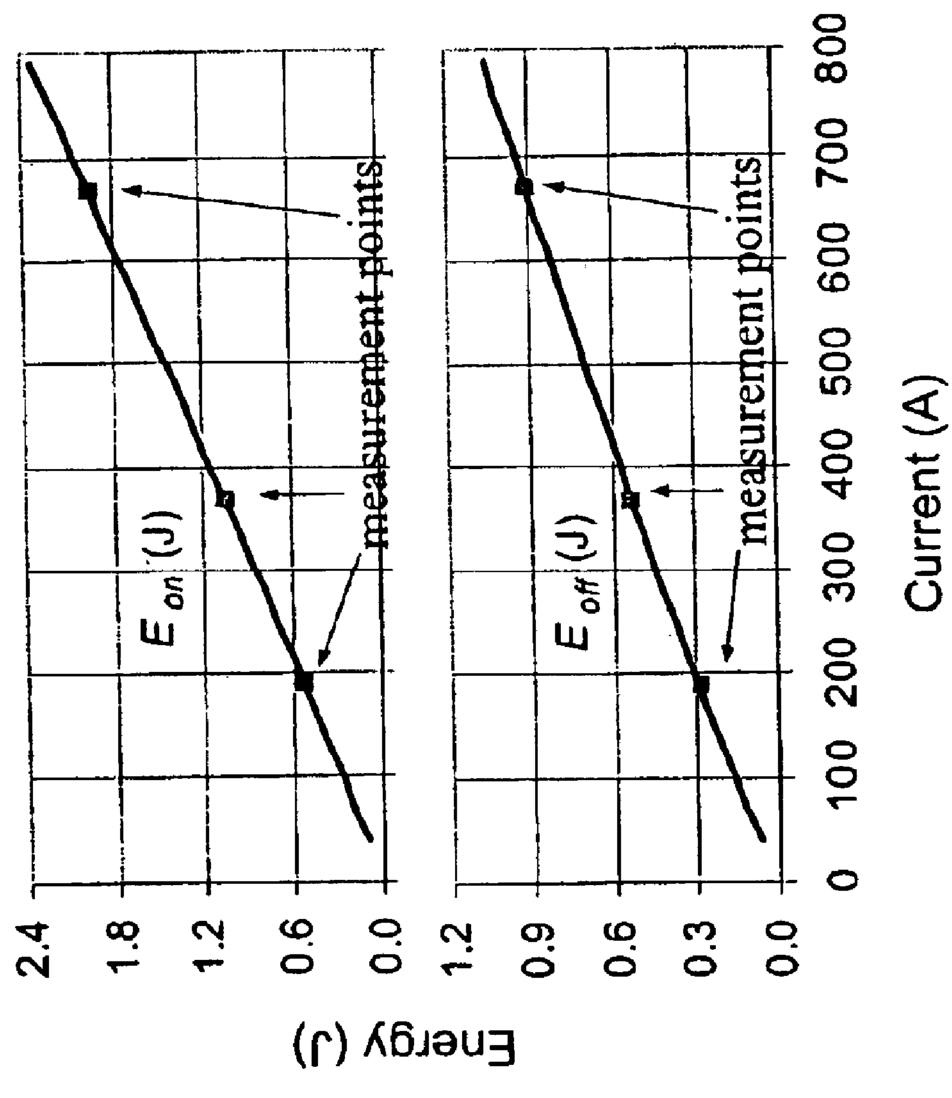
FIG. 10 illustrates the HV-IGBT (CM1200HB-50H) switching energy as a function of current.

FIG. 10 shows turn-on and turn-off energies obtained from both mathematical model and measurement results. Notice that the curve fitting requires only two points. With three points, it is sufficient to calibrate the mathematical model parameters. Turn-on loss is higher than turn-off loss because the IGBT draws substantial over-current due to the reverse recovery of the opposite side diode. The ratio of $E_{on}$ and $E_{off}$ is around 2:1 in our test. Although $E_{on}$ can be reduced with a lower turn-on resistor $R_{g\text{-}on}$, noise within the circuit could be a major problem if $R_{g\text{-}on}$ is further reduced.

Figure 11:
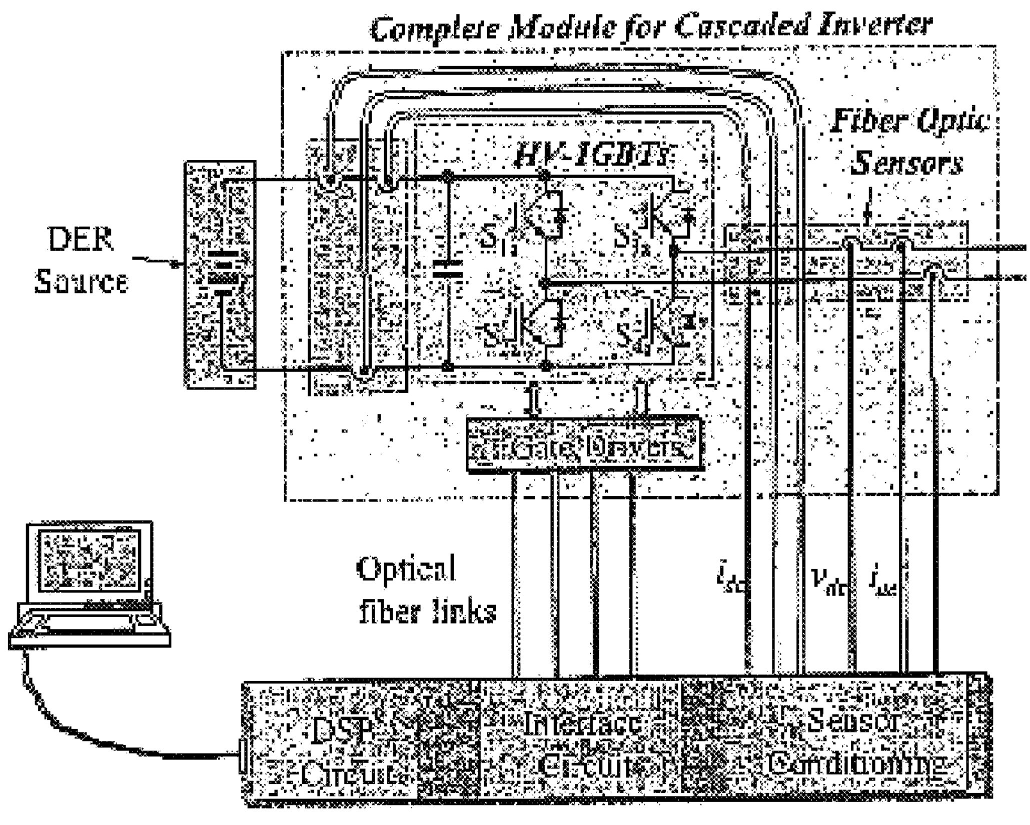
FIG. 11 illustrates an as-built Phase I system showing partitioning and interconnections.

As can be seen in FIG. 11, the inverter system can be partitioned into three distinct areas: the high-power inverter tray with the integrated optical sensors and optically controlled gate drive, the optical gate interfaces and sensor signal conditioning systems, and the digital signal processing (DSP) computer. In this configuration, there is intrinsic isolation between the high-power tray and the low power interface and signal conditioning equipment due to the non-conducting optical fibers. Conventional current, voltage, and temperature sensors for monitoring and comparative analysis were also implemented—making the system less robust in terms of safety and overall reliability.

Figure 12:
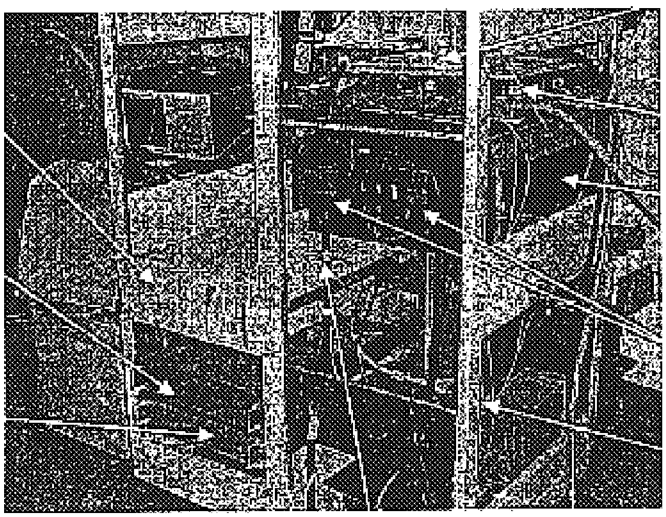
FIG. 12 illustrates a physical realization of the Phase I system showing relative size of all components except external cooling chiller and testing power supply (simulated DER input). It should be noted that if the conventional sensor and their conditioning system were omitted, the complete single-phase system, including the DSP control system, could fit in one standard 7' rack assembly.

FIG. 12 shows the physical realization of the system in two, seven-foot Crenlo rack enclosures. Note that the space above the DSP computer, located in the left enclosure is empty, and that there is considerable open space in the right enclosure as well. Furthermore, the conventional sensor mounting “tray” (located in the right enclosure), and the required conventional sensor signal conditioning interface (located at the bottom of the left enclosure) take up a large portion of workable available volume. These may be omitted later. The optical fiber transmitter was designed with sufficient driving current capability to avoid nuisance tripping due to insufficient light source and switching noise. Typically, longer driving distances require higher current. For the physical assembly shown in FIG. 11 the maximum driving distance is no more than 5 meters.

DER Source Voltage and Power Level Selection

The DER source voltage level varies among different DER device types. Typically, chemical DER sources such as batteries and fuel cells are low voltage in nature. The voltage obtained from rotational generators can be at a level that is high enough for multi-megawatt systems. Thus, based upon today’s availability, the potential DER sources for the proposed inverter system can be microturbines, wind turbines, and small hydro turbines, etc. that produce high voltage outputs through generators. The output voltage level for these turbine generators varies with speed. The maximum DC bus voltage, however, dictates the device voltage rating. Although in certain embodiments a 2.5 kV device was tested at 2 kV DC bus voltage, it is possible to use 3.3 or 6.6 kV devices to allow higher DC bus voltages. As indicated in FIG. 7 through FIG. 9, the turn-off voltage overshoot with certain busbar structure has been limited to less than 7.5%. In a typical thyristor based inverter, this number could exceed 35%. Thus, HV-IGBT devices allow the DC bus voltage level to be closer to the rated device voltage level and still have more voltage margin over the thyristor-type devices that require substantial voltage derating.

With development of other embodiments, the available DER source voltage and power level can ranges from a stand-alone 50 kW test wind turbine to a grid-connected multi-megawatt level generator. The DC bus voltage level can be adjusted with a back-to-back multilevel converter connection. Thus, our voltage and power level selection can simply be based on the device availability. The preliminary selection of the DC bus voltage is 2 kV continuous and 2.5 kV peak under regenerated power flow conditions. The device current, although rated at a continuous 1.2 kA, is generally limited by the thermal/heat removal constraints. The required heat removal capacity for the topology of certain embodiments for every four-device bridge is 16.6 kW. Thus if the efficiency can be pushed to 99%, each full-bridge module can be operated at 1.66 MW, and the three-phase, three-level cascaded inverter power level can reach 5 MW.

Filter Inductance/Capacitance Determination

Figure 13:
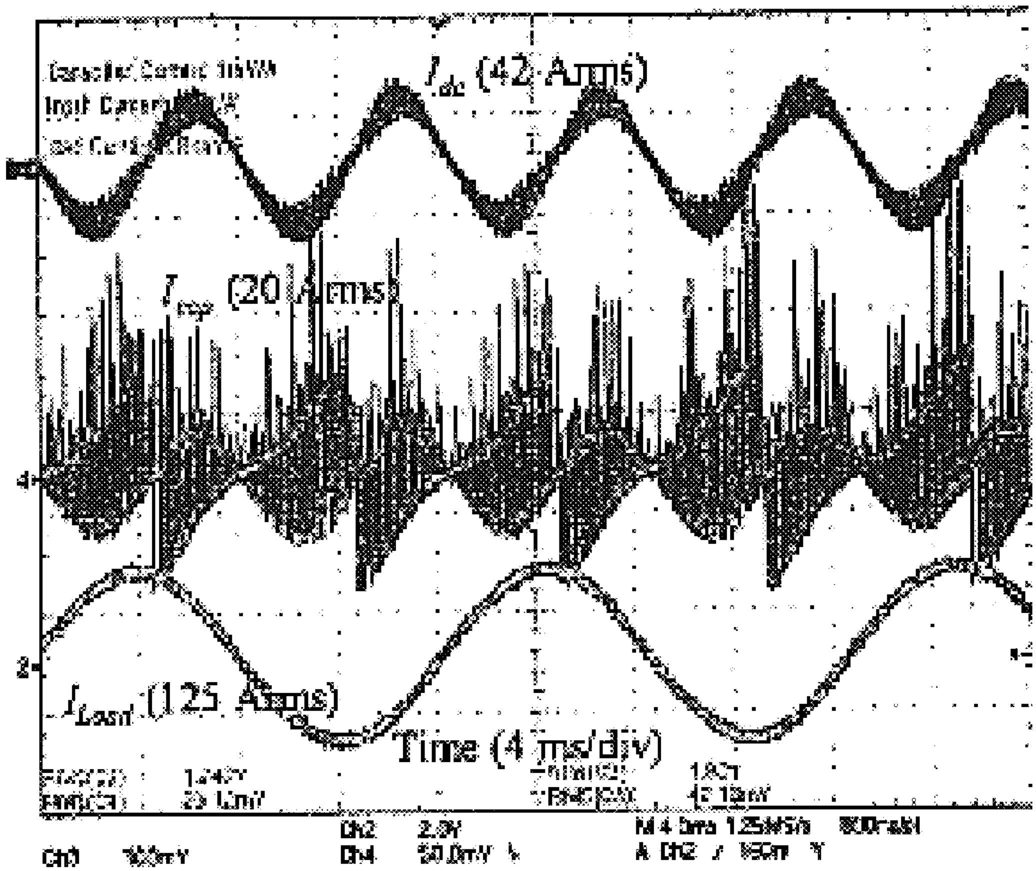
FIG. 13 illustrates Input DC source, DC bus capacitor, and output load current waveforms (top to bottom respectively)

The PWM output voltage contains substantial switching noise. Correspondingly, it is necessary to clean the output AC voltage with high-order filters. Based upon previous experience, a single-stage LC filter is normally sufficient if the switching frequency is high enough. However, with switching frequencies below 5 kHz the filter cut-off frequency is generally chosen to be below 1 kHz to provide sufficient attenuation. In this case, the filter frequency can be close to the low-frequency harmonics, and resonance can occur with nonlinear loads that draw significant harmonic currents. Fortunately, with a multilevel structure, the PWM frequency and the corresponding ripple frequency are effectively multiplied, and thus the filter size can be reduced without sacrificing the output waveform quality. FIG. 13 shows the load current and associated DC link ripple current and DC bus capacitor current. The load current is nearly ripple free with a switching frequency of 5 kHz.

For high frequency, high-current systems, it may be difficult to find cost-effective magnetic cores with sufficient frequency response for the filter inductor. As a result the filter inductor may be fabricated with an air core to avoid saturation. In certain embodiments, a commercial off-the-shelf air-core inductor with water-cooling and tap changing was used. With respect to the filter capacitor, high frequency polypropylene film capacitors that have sufficient frequency response and current handling capability have been tested. FIG. 13 shows that with the capacitor absorbing high frequency ripples, the DC source current contains mainly low-frequency ripples.

Switching Frequency vs. Filter Size and Switching Losses

For PWM inverters, generally speaking, the higher switching frequency, the better the output waveform and the smaller the filter size. However, switching loss proportionally increases with switching frequency, and thermal management becomes a major design constraint for high power megawatt level inverters.

Figure 14:
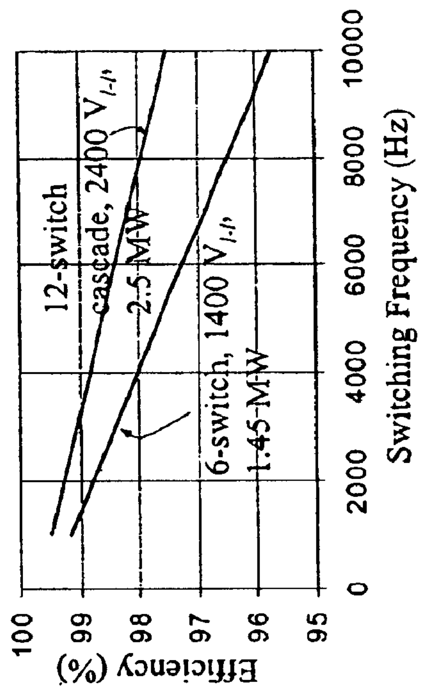
FIG. 14 illustrates HV-IGBT inverter efficiency as a function of switching frequency and inverter configuration.

FIG. 14 shows the HV-IGBT inverter efficiency as a function of switching frequency. As can be seen, the 12-switch cascaded inverter is more efficient than that of a 6-switch system at all relevant switching frequencies, even with a higher system power rating. Although initial component costs will be higher with a 12-switch configuration, over an assumed amortized life cycle of five years and a 0.5%–1.0% savings in efficiency at a conservative $0.02 per kW-Hr, the 12-switch system quickly recoups the component cost differential.

Figure 15:
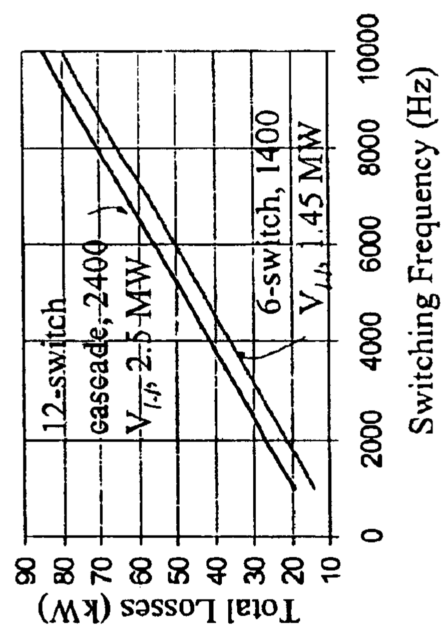
FIG. 15 illustrates HV-IGBT inverter losses as a function of switching frequency and inverter configuration.
Figure 16:
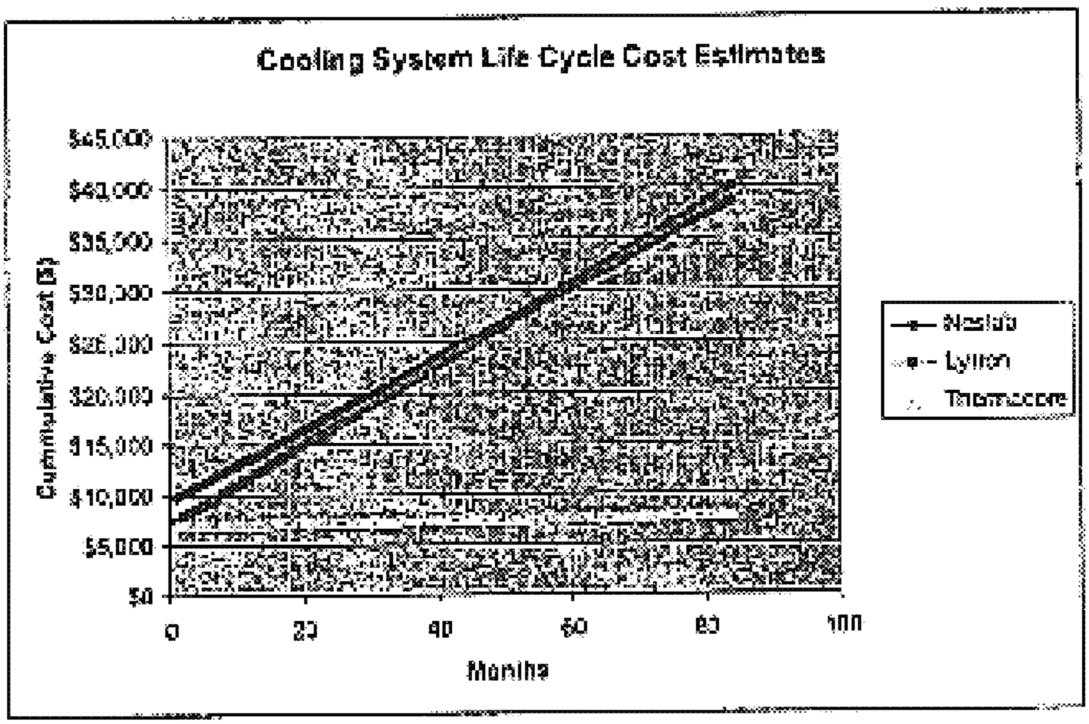
FIG. 16 illustrates cooling system life-cycle cost estimates as a comparison of competing technologies.

FIG. 15 shows the HV-IGBT inverter system total power losses as a function of switching frequency and inverter configuration. While the losses of a 12-switch system are $\sqrt{3}$ times larger than a comparable-sized 6-switch system, the efficiency of a 12-switch system is much higher.

To a limited extent, filter size is inversely related to switching frequency. From a practical point of view it is easier to fix the size/footprint/ratings of available filter components to the system, then to adjust the switching frequency to optimize losses.

Finally, driving the maximum switching frequency by limiting the acceptable losses within the system is the capacity of the cooling system. In some instances the facilities are limited to sinking no more than 5 kW, which places overall power limitations on the maximum levels that can be tested with certain embodiments of the inverter system. Other embodiments addresses this specific limitation by moving away from a de-ionized cooling system to an integrated heat pipe configuration that can sink 16.6 kW per full-bridge module, thus enabling higher switching frequencies. According to FIG. 15, embodiments configured as three full-bridge inverter modules and the total output power at 2.5 MW level, the total losses that can be cooled by off-the-shelf heat pipe assemblies indicate that a switching frequency in excess of 5 kHz is possible.

Inverter Control and DER Sources

The cascaded multilevel inverter can achieve better output waveforms with lower switching frequency. The focus of certain embodiments is to develop a modular three-level inverter. The advantage of a modular design is that it is easily scaled to a higher power level with a higher voltage by cascading modules. The inverter control can be PWM or selected harmonic elimination, implemented in part by a change in control software. For DER applications, the dynamic response is important, but not as demanding as in motor drive applications. Thus, it is possible to adopt an optimum harmonic elimination technique, allowing switching frequencies below 1 kHz, thus enabling the inverter to achieve 99.5% efficiency. Note that filter size is also reduced because the filter cut-off frequency will be higher than the switching frequency.

When a DER source voltage varies, the power factor is generally regulated to control the output voltage, keeping it constant. As described in certain embodiments, power factor angle control allows the inverter output voltage to maintain proper magnitude by adapting to the utility voltage level. Thus, power flow control with DER sources can be easily achieved.

Total System Efficiency

A representative total system efficiency for a 12-switch system was presented above in FIG. 14. Depending upon switching frequency, which is driven in part by the size of the cooling system, a system could be operating within the range of 98.0% to 99.5% efficiency. Although a custom designed heat pipe assembly is possible, off-the-shelf heat pipe that has 8.3-kW cooling capability per two switching devices can also be used. Thus, the inverter efficiency can be approximately 99% for a multi-megawatt inverter. If the optimum harmonic elimination method is adopted as a control methodology, the efficiency of a 5-MW inverter system could reach 99.5% using cost-effective off-the-shelf cooling devices.

Figure 17:
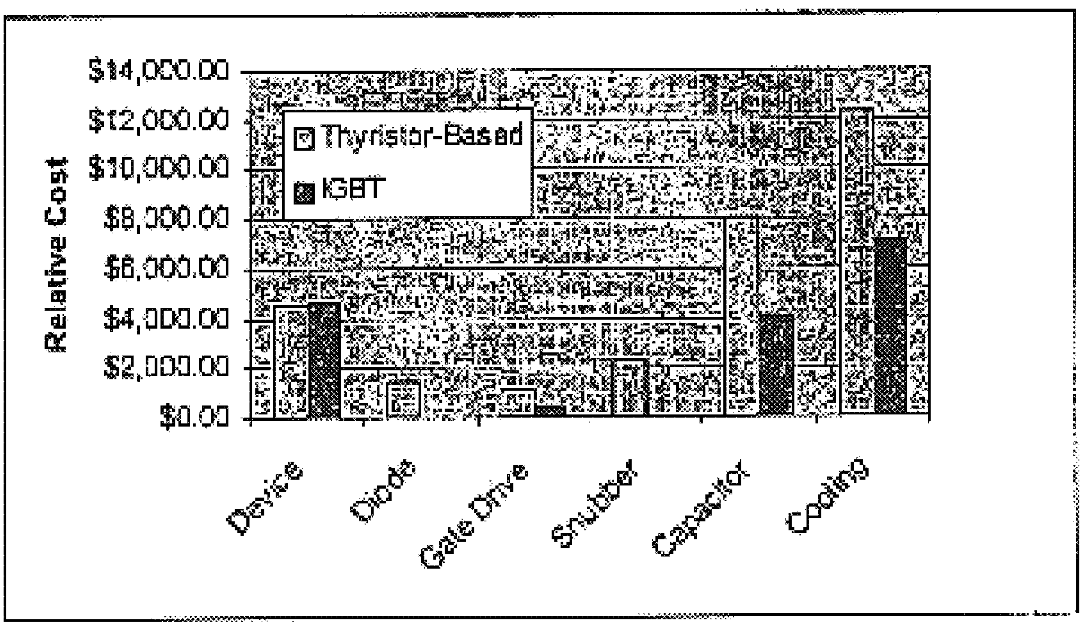
FIG. 17 illustrates a cost comparison between major components in a thyristor-based system and an HV-IGBT system.

Costs can be compared to those for building a thyristor-based system that is rated at 1 MW per phase. Because all material costs involved with this system are known, it is fairly easy to get a reference between the costs associated with prototyping a MW-level thyristor system and a MW-level HV-IGBT system. FIG. 17 shows the costs for major components for each type of system.

System Size and Weight

An as-built prototype single-phase inverter system was shown in FIG. 12. Comparable power systems generally utilize one seven-foot cabinet per phase leg as well as a separate cabinet for control and instrumentation. Note that these systems typically do not include the complete cooling systems within their structure.

Some systems are limited only by the size of the Thermacore heat pipe subsystem. It is conceivable that while some systems will occupy 2–3 cabinets, the vertical size of these cabinets will be smaller (4–5 feet).

Finally, the weight reductions will be significant. Current estimates are that some systems' total inverter system will weigh less than 42% of a comparable thyristor-based system, including the self-contained cooling system.

System Protection Features

One significantly advantageous feature of the HV-IGBT based system over the thyristor-based system is the desaturation protection, which shuts down the IGBT when there is a shortcircuit at the output or a shoot through between upper and lower devices. This feature is highly desirable for voltage source inverters. With thyristor-based systems, conventional designs typically add ultra fast fuses to protect the device, and the fuse cost can be as high as the switching device itself.

In addition to the desaturation protection, there are other protection features which may be built in certain of the embodiments:

1. Over-current protection. The fiber optic current sensor signals including output AC and input DC currents may be fed back to the DSP for over-current protection. Because the desaturation protection can shut down the unit within 20 μs when there is a major fault or short circuit, the over-current protection circuitry does not have to react instantaneously. The IGBT may allow twice the rated current for 8.33 ms, the fist half cycle. Since the nominal operating point of certain inverter embodiments is only set at ⅔ of the rated current, the set point of the over-current condition can be at the device rated RMS current. Correspondingly, the tripping time can be set at the end of the second cycle, which is typically well below the thermal time constant. In other embodiments the over-current setting may be adjusted to meet the actual system protection requirement.
2. Over-voltage protection. The inverter can be protected with surge arrestors under transient conditions. The surge protection feature, although typically complying with the ANSI C.62 standard, can have the voltage level much higher than the device voltage level. In certain embodiments, the output terminal and DC bus voltages are all sensed with fiber optic sensors with sufficient response that the DSP can send the fault signal to disconnect the inverter from the system when there is continuous over-voltage condition. In certain embodiments, the device voltage rating is 25% higher than the DC bus voltage. However, in other embodiments, the 3.3-kV device may be adopted for more than 50% voltage margin. This will allow the inverter to continue operation under minor disturbances such as heavy load shedding and power factor correction capacitor switching in a nearby substation.
3. Under-voltage protection. Under-voltage protection can be easily implemented the same way as the over-voltage protection because the voltage signal is present in the DSP. Although the trip level in certain embodiments is set at 80%, it can be adjusted in other embodiments by simple software changes.
4. Over-temperature protection. Thermal management is sometimes the key to successful design in the high power inverter. Chains of optical temperature sensors can be routed throughout the various heatsink assemblies that can be attached to each phase leg to ensure that hot spots are detected. The set point of these optical temperature sensors can be adjusted in certain embodiments to accommodate the new heat pipe cooling capacity.
5. Auxiliary power supply under-voltage protection. It is generally desirable to fault the inverter if there is any under-voltage within the auxiliary power supply to prevent the HV-IGBT going into linear-region operation.
6. Unbalance protection. Although the multilevel inverter allows unbalanced operation, it is highly desirable for the inverter to be derated under unbalanced system loads. If the unbalanced condition is severe, such as loss of one phase or two phases, the inverter may shut down. The unbalanced condition can be detected by output current sensing, which has been built in and can be implemented through software.

System Redundancy

The multilevel inverter allows stacking of inverter modules connected in series. If there is a failure in one module, then that specific module can be isolated and its AC terminal can be shorted to allow the system to continue operation with derated output.

Fiber Optic Current Sensor (FOCS) Implementation

One focus of certain embodiments has been on the realization of a sensory system that meets the performance specifications of conventional sensors while providing the inherent benefits of optical fiber: immunity to radiated EMI, electrically non-conductive, intrinsically safe, etc. Some embodiments have provided the world's first quick connect/disconnect current sensor for circular conductors, and the technology has been successfully applied to other embodiments. The figures described below provide a brief overview.

Figure 18:
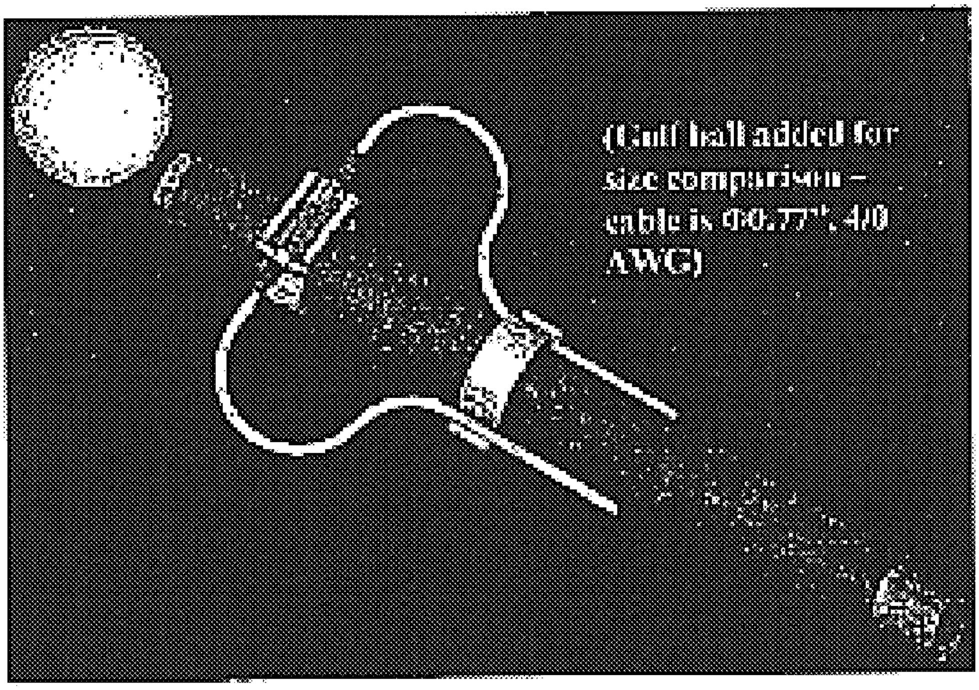
FIG. 18 illustrates a CAD model of a quick connect/disconnect fiber optic current sensor. The FOCS sensor was completely modeled and simulated before the first prototype was ever produced.

FIG. 18 is a computer model illustrating the design of a sensor that is robust and versatile. By simply changing the sensor crystal, currents as small as a few ampere's or as large as several tens of thousands of amperes are measurable, utilizing the same housing.

Figure 19:
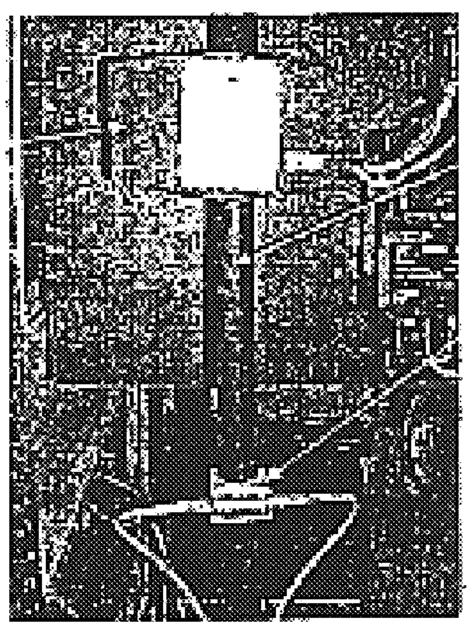
FIG. 19 illustrates a 4000 A FOCS installed on the Phase I 4/0 AWG load cable and co-located with the LEM CT to provide correlated measurements.

FIG. 19 shows a LEM 1005-T current transformer co-located on the load cable with Airak's FOCS. The LEM CT has a maximum current of 2000A, while the Airak FOCS has been tested to nearly 4000 $A_{pk-pk}$. Installation of Airak's FOCS was literally a snap—the sensor clips onto the load conductor and the fiber cables are dressed to the rear of the signal conditioning equipment. Contrast this with the LEM 1005-T, which requires the rigid conductor be "snaked" through it during installation.

Figure 20:
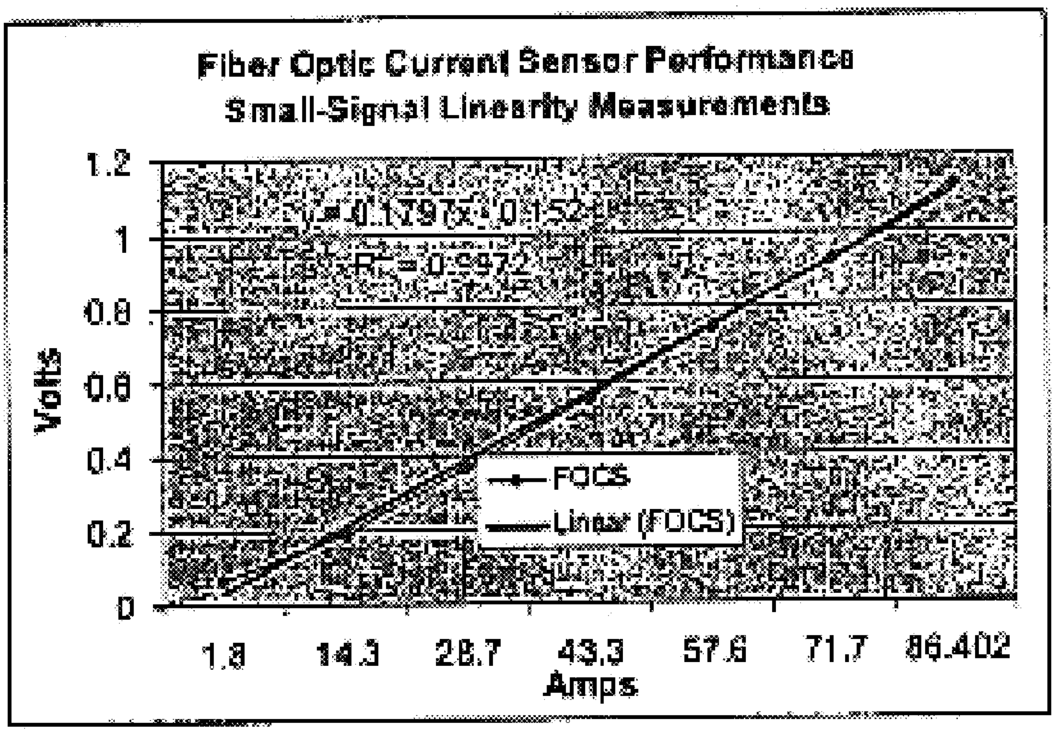
FIG. 20 illustrates a small-signal linearity measurement of the FOCS.

FIG. 20 shows the small-signal linearity performance of the FOCS up to 86 A RMS. The plot reveals high linearity overall with an $R^2$ of 0.9972. This includes the deviation that occurs at extremely low currents. Omitting the reading at 1.8A results in an $R^2$ of 0.9999.

Figure 21:
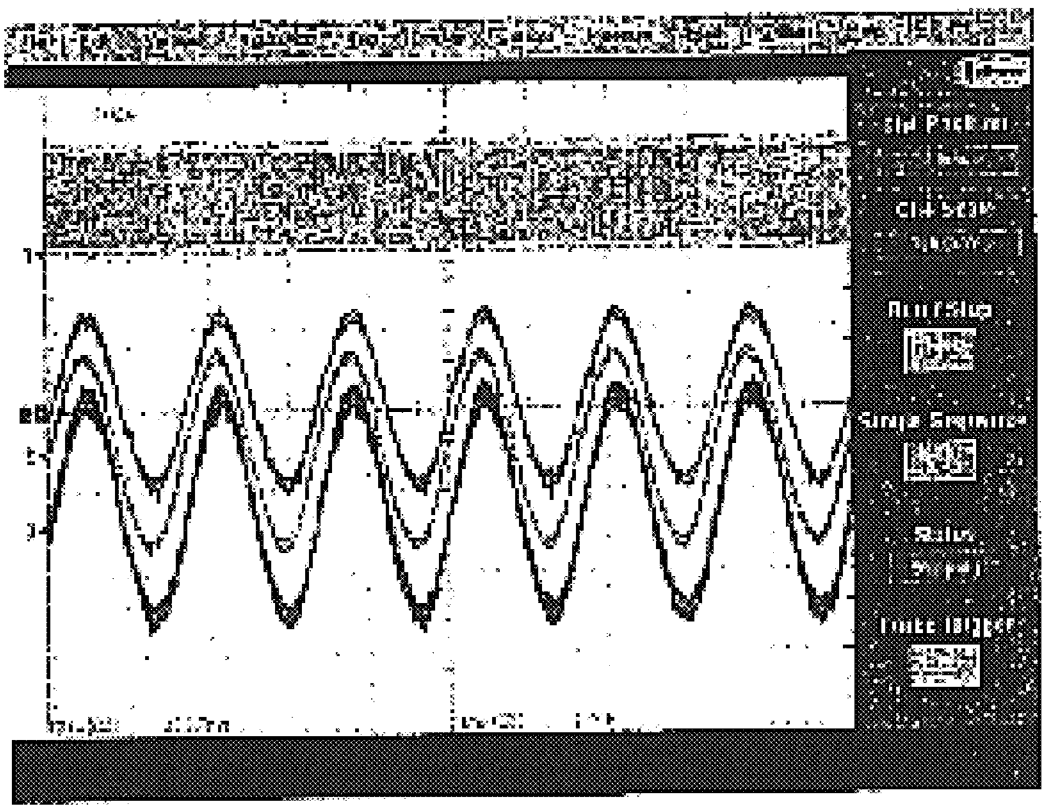
FIG. 21 illustrates a screen snapshot of the FOCS compared to other current sensors.

FIG. 21 shows the load current output during a 100 A test with the FOCS, compared to a Rogowski coil and a LEM CT. The top trace is the gate drive voltage command signal. The second trace (green) is the LEM sensor; the third trace is the Rogowski coil, and the bottom trace is the FOCS. The amplitude differences between the Rogowski and LEM as compared to the FOCS can be attributed to the FOCS scaling amplifiers being off by less than a factor of two. As can be seen in the figure, the FOCS compared favorably to all other signals, and in addition provides the aforementioned intrinsic benefits of fiber optic isolation. For the purposes of this program the FOCS development is completed, and this topology is applied according to certain embodiments of the present invention.

Optical Voltage Crystal Development

A major effort of certain embodiments of the present invention was to develop a class of crystals that could be used as voltage sensors. A crystal composition was tested in excess of 1000 v.

Figure 22:
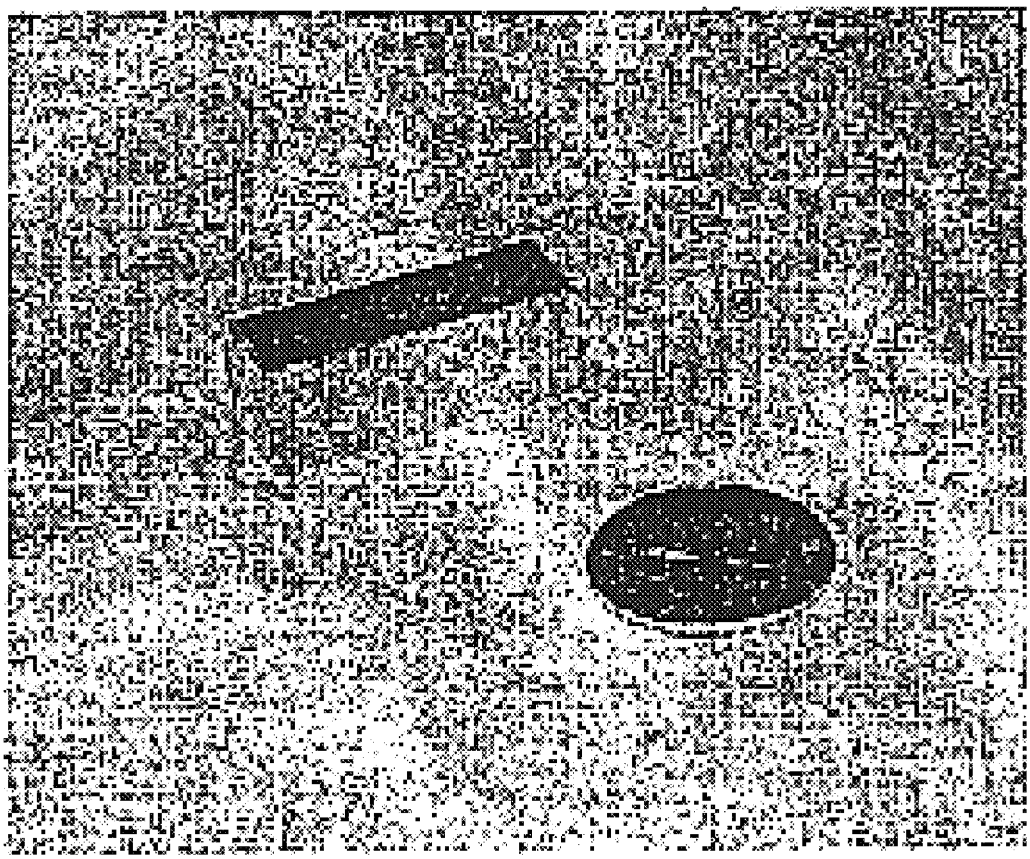
FIG. 22 illustrates a crystal for voltage measurement applications.

FIG. 22 shows one of the prototype voltage crystals. The dimensions are 9 mm×9 mm×25 mm; light travels axially down the length of the crystal. The crystals are coated with gold on opposing sides to allow direct application of the voltage potential.

Figure 23:
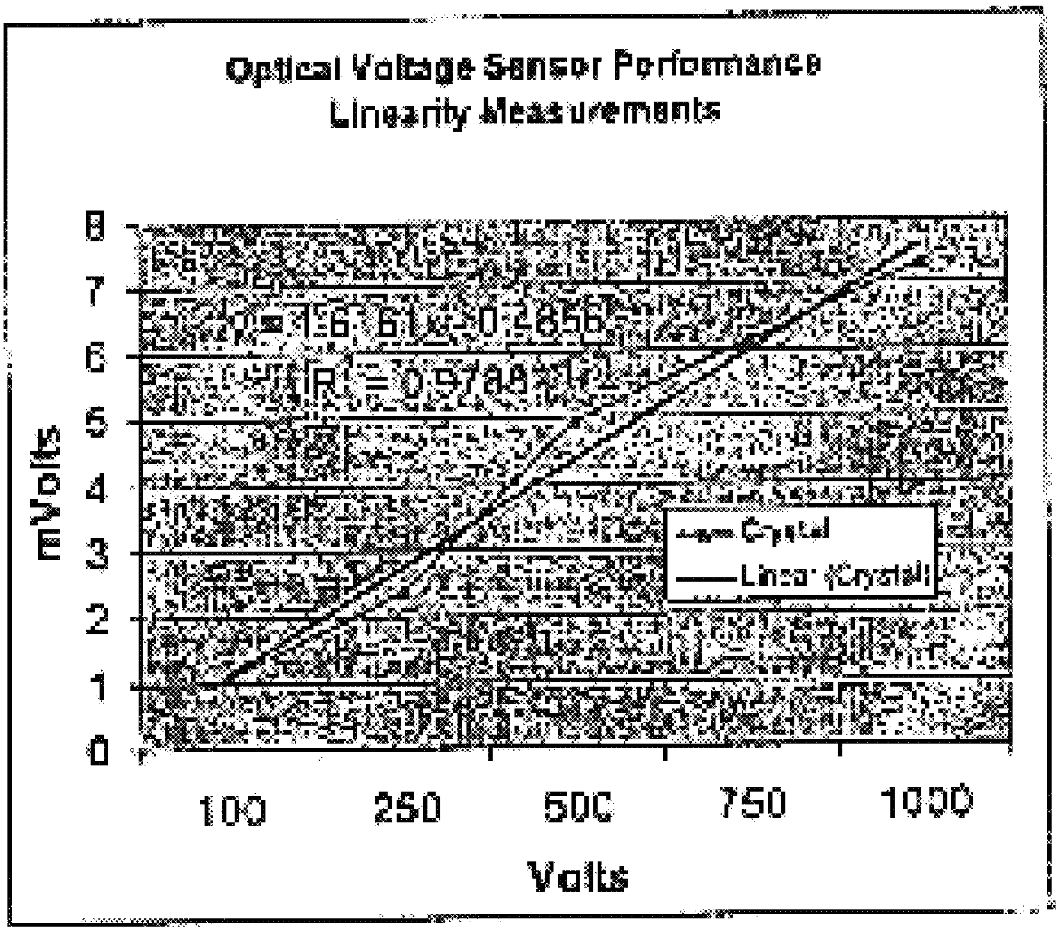
FIG. 23 illustrates a small-signal linearity measurement of the optical voltage sensor.

The transfer characteristics of this crystal are shown in FIG. 23. The crystal behaves very well within the range 100V–1000VAC. According to certain other embodiments, the length, and the composition, are tailored in order to attain measurement capability in excess of 2500V.

Figure 24:
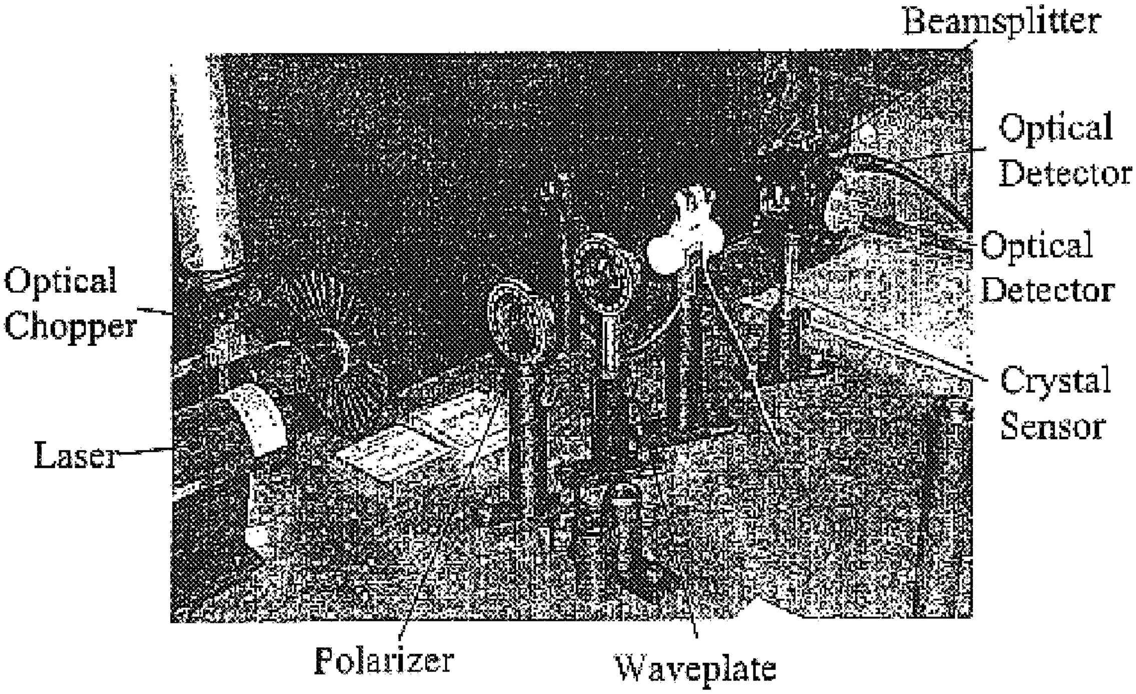
FIG. 24 illustrates a bulk-optic system used to characterize voltage sensor crystals.

FIG. 24 shows the bulk-optic system used to characterize the voltage sensor crystals. Operation of this system is straightforward. Unpolarized laser light at 1150 nm (near infrared) is projected through an optical chopper to a polarizer, where an initial state of polarization (SOP) is established. The light then travels through a waveplate, which converts the linear SOP to an elliptical SOP. This elliptical SOP now travels through the sensor crystal that has an unknown voltage applied across it, changing the elliptical SOP back into a linear SOP, while causing the initial SOP to rotate a fixed number of degrees (modulate) which is proportional to the applied voltage (the Pockel's effect). The modulated SOP is then applied to a depolarizing beamsplitter, which separates the modulated SOP into orthogonal components. These orthogonal components are then detected using standard infrared detectors and the signal is processed to determine the magnitude of rotation of the SOP, which directly indicates the voltage.

Figure 25:
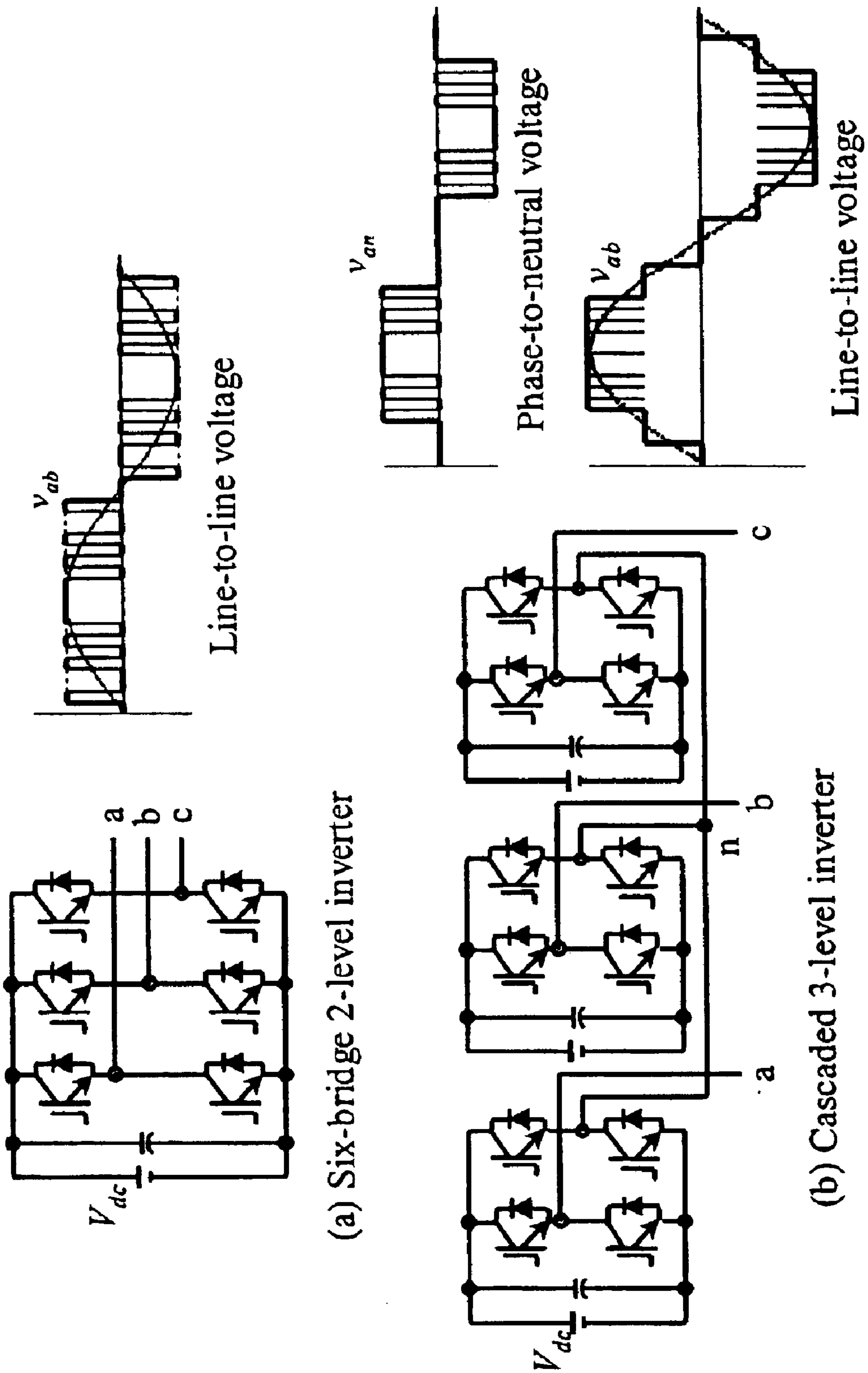
FIGS. 25(*a*) and 25(*b*) illustrate inverter circuit topologies.

Another embodiment of the present invention is graphically depicted in FIG. 25. In this embodiment, optically isolated 5-MW multilevel-cascaded inverter for DERs that use HV-IGBTs are described. Yet another embodiment is a 5-MW DER Simulator System (DERSS) testbed that is based upon the power stage. This embodiment results in the creation of the entire DERSS topology, control algorithm development, and modeling/testing that enables an optically isolated three-phase 5-MW AC-DC converter. This converter development path converges with Airak's inverter path to produce the industry's first optically isolated DERSS.

High-Power HV-IGBT Module Topology

Shown in FIG. 25(*a*), a conventional inverter uses six switches to obtain a three-phases output voltage. The six-switch inverter output voltage is generally only swung between 0 and $V_{dc}$. Although the output line-to-line voltage shows three voltage levels, this is considered a two-level output per phase. Contrasting, the three-level cascaded inverter circuit in FIG. 25(*b*) allows three-level output voltage on each phase, thus its line-to-line voltage becomes five levels. Additional voltage levels allow more degrees of freedom which reduces harmonic generation. Without PWM operation, the output of a conventional 6-switch inverter is a 6-step waveform, but with the three-level cascaded inverter it is a 12-step waveform. Among the more significant harmonics for a 6-step waveform are $5^{th}$ and $7^{th}$ harmonics possessing 20% and 14% magnitudes, respectively. Among the most significant harmonics for a 12-step waveform are $11^{th}$ and $13^{th}$ harmonics with 9.1% and 7.7% magnitudes respectively. By increasing the number of levels, harmonics will continue to rise in frequency, and their magnitude will be further reduced. Thus, the filtering becomes significantly easier with a multilevel structure. Adding PWM control reduces harmonic content even further for both conventional 6-switch and three-level 12-switch inverters. The three-level 12-switch inverter effectively doubles the harmonic frequency, even with the same PWM switching frequency, and again significantly reducing the filter size.

In certain embodiments of the present invention, the three-phase three-level cascaded inverter is used because it often represents the basic building block of the multilevel inverter. It can be scaled up easily to multi-megawatt levels once the basic building block technology has been validated.

Full-Bridge Module Power Stage Fabrication

Figure 26:
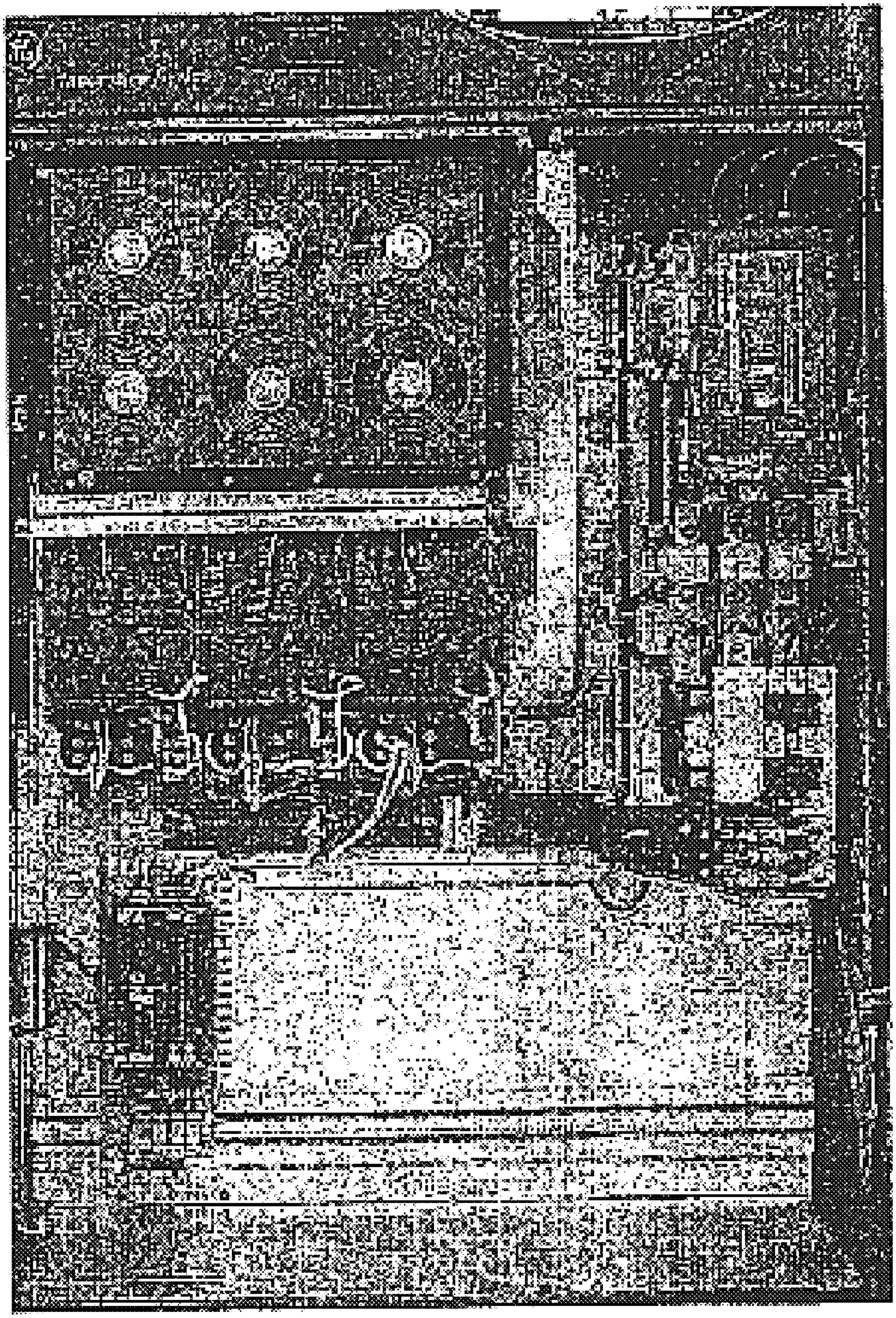
FIG. 26 illustrates a Thermocore Therma-Charge heat pipe assemblies mounted in a GE Innovation Series motor drive (picture courtesy of Nelson Gernert, Thermocore)

One purpose of this task is to fabricate three identical power stages of the full-bridge module developed in the Phase I effort. Several CAD drawings developed in the design of certain embodiments may be used for "mass" production. These drawings may include (1) AutoCAD drawings of the power busbar, (2) schematic and PCB drawings of the gate driver, and (3) schematic and PCB drawings of the interface boards. A heat pipe cooling system may be integrated with the power devices for proper heat removal. The model of a heat pipe according to certain embodiments is shown in FIG. 26, installed in a GE Innovation Series motor drive controller.

Development of Optimum Harmonics Elimination Method

The switching frequency of the inverter may be determined according to the heat pipe capacity. A key factor is the trade-off between the cooling capability and the switching frequency. Once the switching frequency is determined, the harmonic reduction method can then be developed. The traditional sinusoidal PWM method is typically not used because it generally requires substantial filtering. A dedicated three-level optimum harmonic elimination method, optimized to this system, allows the use of smaller output filter.

Output Filter Design and Optimization

The output filter performance may be simulated based on the three-level optimum harmonic elimination technique. Once the cut-off frequency is determined, the output filter may be designed and fabricated. According to certain embodiments, the output filter inductor may be air core and the output capacitor may be polypropylene film based.

Optical Interconnects, Sensors, and Conditioning Circuits

Optical Interconnects

Optical fiber for gate drive control signals has been used for many years and is a common design practice in high power inverters. The reliability related to fiber optic cable connection is a concern. The fiber optic cable linking the interface board and the gate driver board could fail in field applications. For a robust design, the circuit should treat any connection problem as the fault condition. If the circuit fails to detect such a fault condition and does not shutdown the control properly, it is possible to completely destroy a power module. This scenario has been reported in several existing high power inverter systems. Thus, it is preferable to design the fiber interconnects and control system for fail-safe operation. Therefore, according to certain embodiments, more thorough testing and failsafe circuitry is used to prevent a nuisance failure due to the optical interconnects.

AC Optical Current and Voltage Electro-Optic Support System

Figure 27:
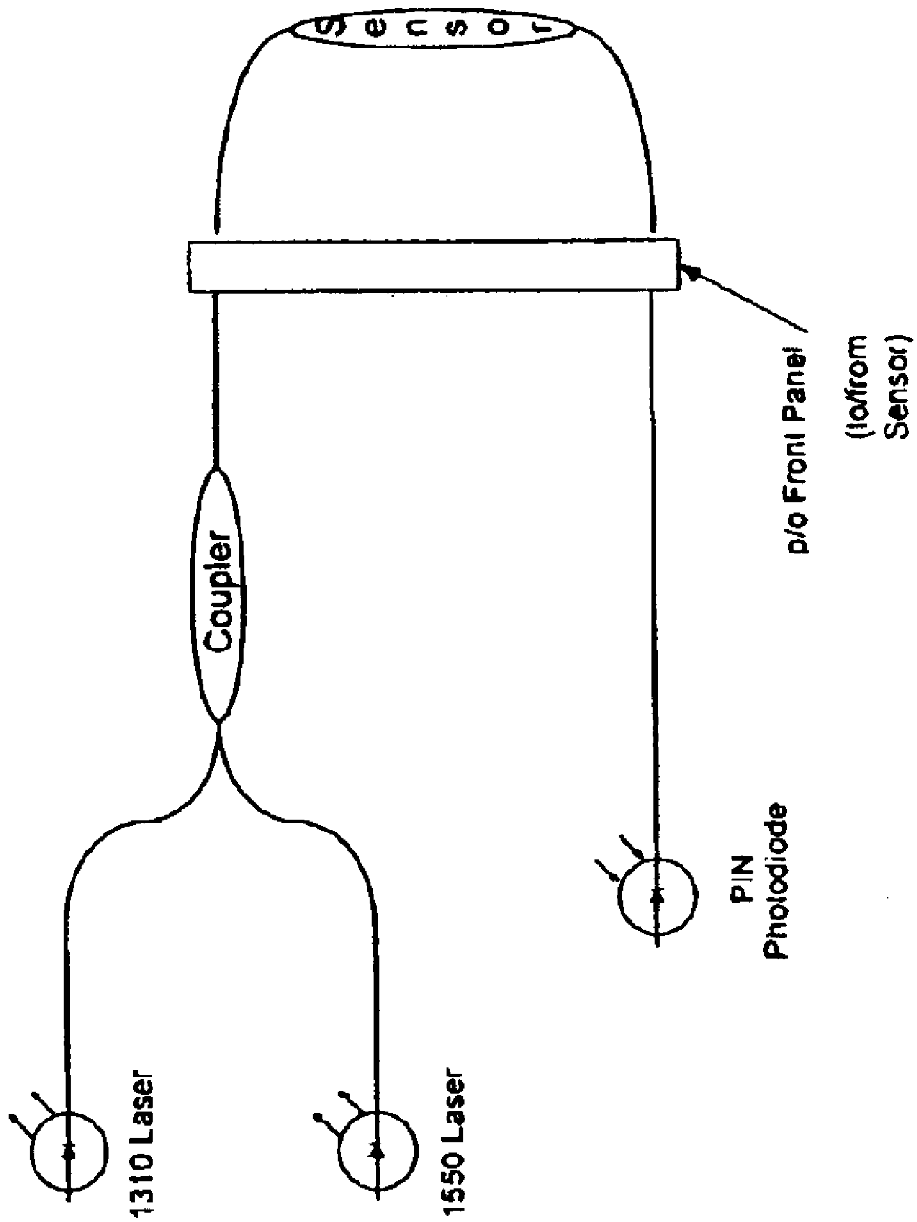
FIG. 27 illustrates a standardized optical topology for AC current and voltage measurements.

By design and to produce manufacturing quantities of scale, the electro-optic support systems for AC measurement of optical current and voltage may be chosen as equivalent. A generalized optical configuration is shown in FIG. 27.

Two different laser light sources may be used in Airak's systems to mitigate temperature changes experienced by the crystal. Differing temperature sensitivities at different wavelengths can be exploited to determine crystal temperature (for a detailed discussion of this phenomenon refer to Equation (6)). By alternating the active laser at any given time at a rate faster than the highest frequency component of current or voltage being measured, the measured current or voltage can be assumed to be the same value and any difference can be attributed to temperature affects in the sensor.

The laser light travels down the optical fiber to the sensor, which modulates the intensity of the light. The modulation is induced by external current or voltage fields. The light then travels down the return fiber, where its intensity is detected by a standard telecommunications photodiode. The output of the photodiode circuit is a linear representation of the modulating voltage or current and the representative linearity of these measurements are shown in FIG. 20 for current and FIG. 23 for voltage.

Figure 28:
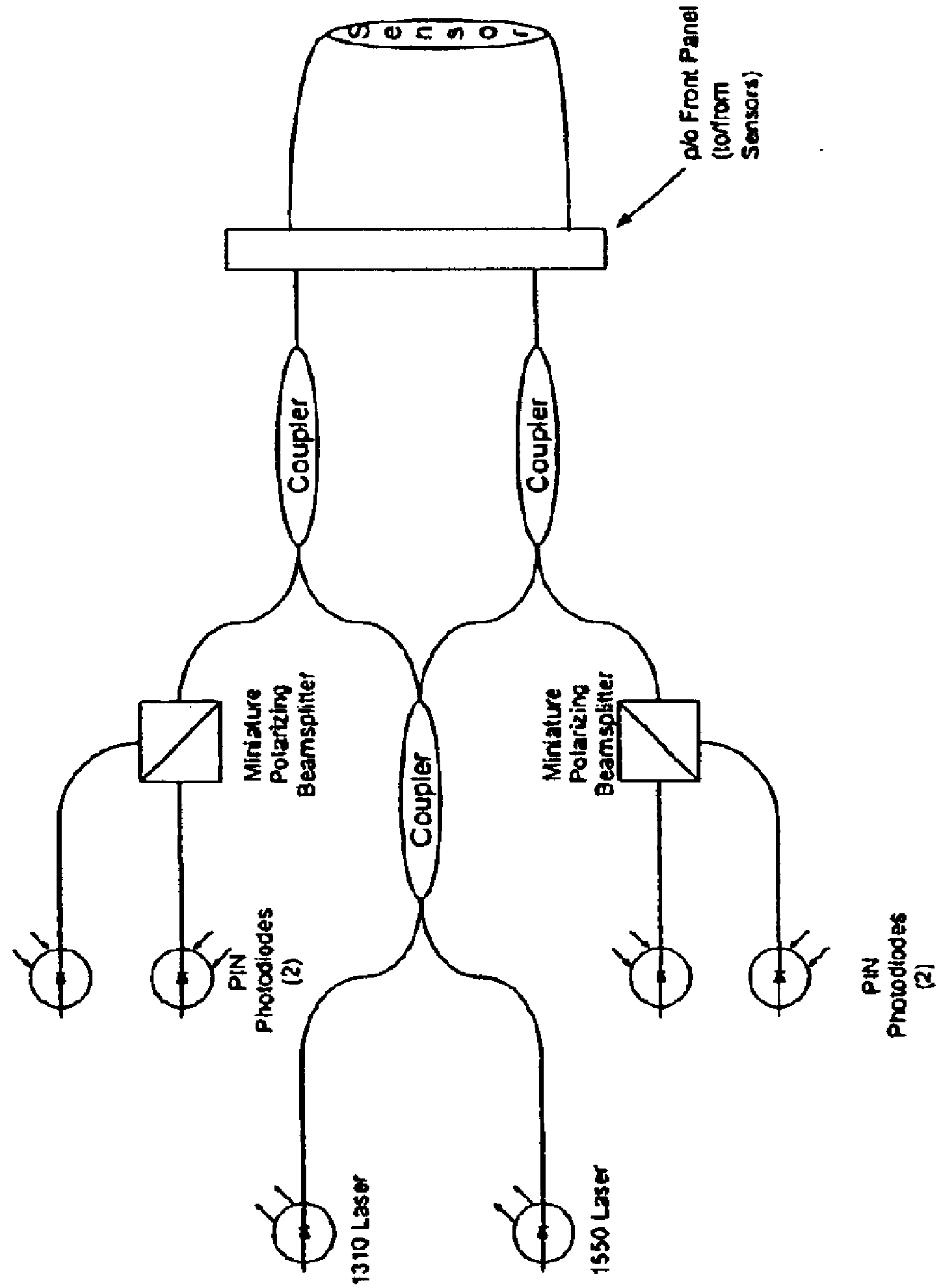
FIG. 28 illustrates standardized optical topology for DC current and voltage measurements.

One of the issues with respect to long-term stability is drift in the laser driver circuits, which manifests itself as an intensity change at the photodiode. Hence, laser drivers and signal recovery circuits may be used to ensure a better than 1% long-term stability DC Optical Current and Voltage Electro-Optic Support System As with the previous AC-measurement system, the DC measurement system may be the same whether we are measuring voltage or current. Many of the same components used in the AC system are used in the DC system, further increasing manufacturing quantities of scale. Unfortunately, the measurement of DC using optical methods is more difficult than its AC counterpart, due primarily to the requirement of DC stability with the optical signal as well as with the analog signal processing circuits. FIG. 28 shows the standardized topology.

As with the AC measurement system, two lasers may be used to quantify temperature as well as the voltage/current at the sensor location. As can be seen in FIG. 28, this system is a bi-directional system in that laser light propagates in BOTH directions through the sensor assembly. This reciprocal effect results in of minimizing the influences of bending the optical fiber (e.g., at installation), as well as nulling any vibration imparted on the fibers by operating motors, generators, etc.

Despite the increase in complexity of the DC measurement system, initial test results with a prototype at Airak show that this configuration has nearly double the signal-to-noise ratio of the system shown in FIG. 27. Furthermore, this system can monitor either DC-or-AC signals, with minimal optical drift. Hence, for high dynamic-range applications, FIG. 28 may be the topology that will find widespread deployment in applications requiring highly accurate (e.g., possible metering grade), long-term stability of the measurement system.

Due to the use of the miniature polarizing beamsplitters, there are four (4) optical signals to process. Analog components may be used in the processing of these optical sensor signals, as can an all-analog interface. In the event that the analog system accuracy, resolution, and/or drift are not suitable to monitor the DC bus structure to the required precision, then the optical signals may be processed by the DSP that is used in the gate-driver subsystem.

Optical Temperature Sensors

To reduce the chance of thermal failure, certain embodiments are sized appropriately and use the Thermacore heat pipe technology. Previously, the loss of the HV-IGBT elevated the need to integrate temperature sensors directly into the gate drive fault system. Using conventional thermocouples negates the all-optical interface between the individual phase legs and the DSP controller, jeopardizing the intrinsic noise immunity, safety, and higher reliability that an all-optical system provides.

According to certain embodiments, distributed optical temperature sensors may be integrated throughout each phase module and the output may be linked to the gate drive master fault signal, providing a robust temperature monitoring solution that will prevent thermal destruction of the switches. This may be accomplished using a mature optical technology borrowed from the telecommunications industry: fiber optic Bragg gratings.

Fiber Optic Bragg Gratings (FOBG).

Figure 29:
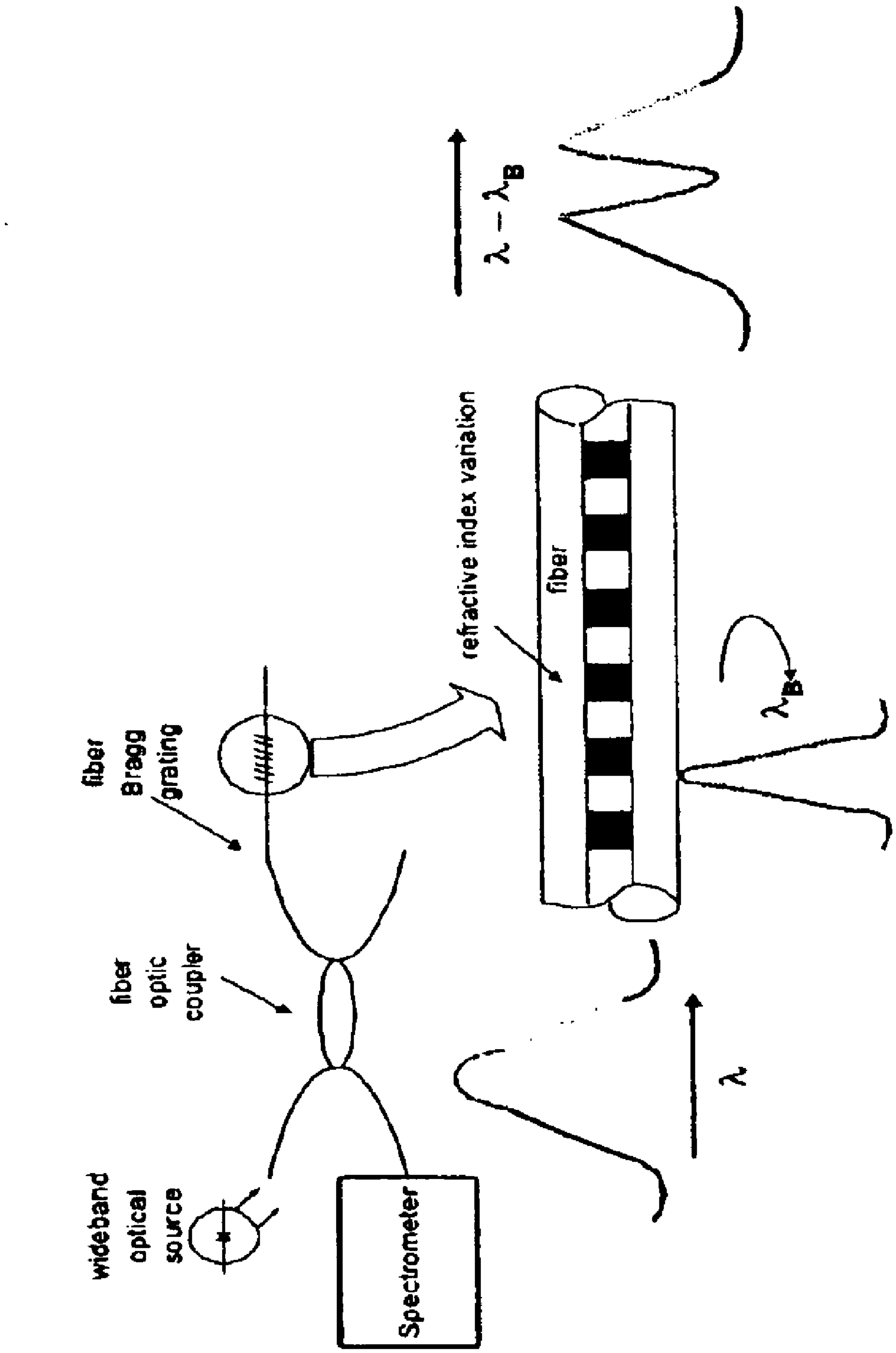
FIG. 29 illustrates the principle of operation for Bragg gratings.

FOBGs are made from standard optical fiber. Essentially, a precise refractive index mismatch is "burned" repeatedly into the fiber, establishing an interference pattern that reflects a specific wavelength (color) of light. FIG. 29 shows the conceptual layout of the system. Typically, a wideband optical source, such as a white LED (light emitting diode) may be used to insert light into a fiber. A fiber optic coupler passes this light energy, indicated by $\lambda$, into the Bragg grating region, where all but a certain color of light passes. The color that is subtracted out, in this case indicated by $\lambda_B$, is reflected back towards the optical coupler. The remaining spectra, indicated by $\lambda-\lambda_B$, is passed down the fiber, and can be used to drive additional Bragg gratings located at different wavelengths. The signal that is reflected, $\lambda_B$, is passed on to a device called a spectrometer, which is the equivalent of an electronic prism. The spectrometer precisely measures the wavelength of the incoming signal.

Figure 30:
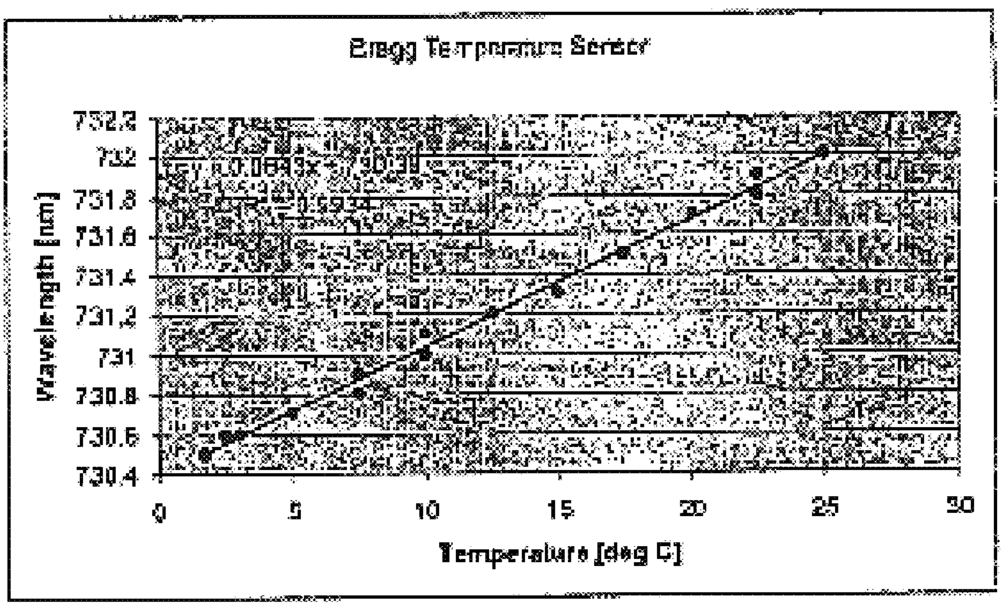
FIG. 30 illustrates the Bragg grating wavelength shift as a function of temperature.

Bragg gratings are extremely temperature sensitive. This is because the area containing the Bragg grating will physically change its dimensions as temperature changes, causing the color of the reflected light to shift as temperature varies. This shift in wavelength is linear with respect to temperature. FIG. 30 shows representative data for a grating located in the near infra-red region.

Figure 31:
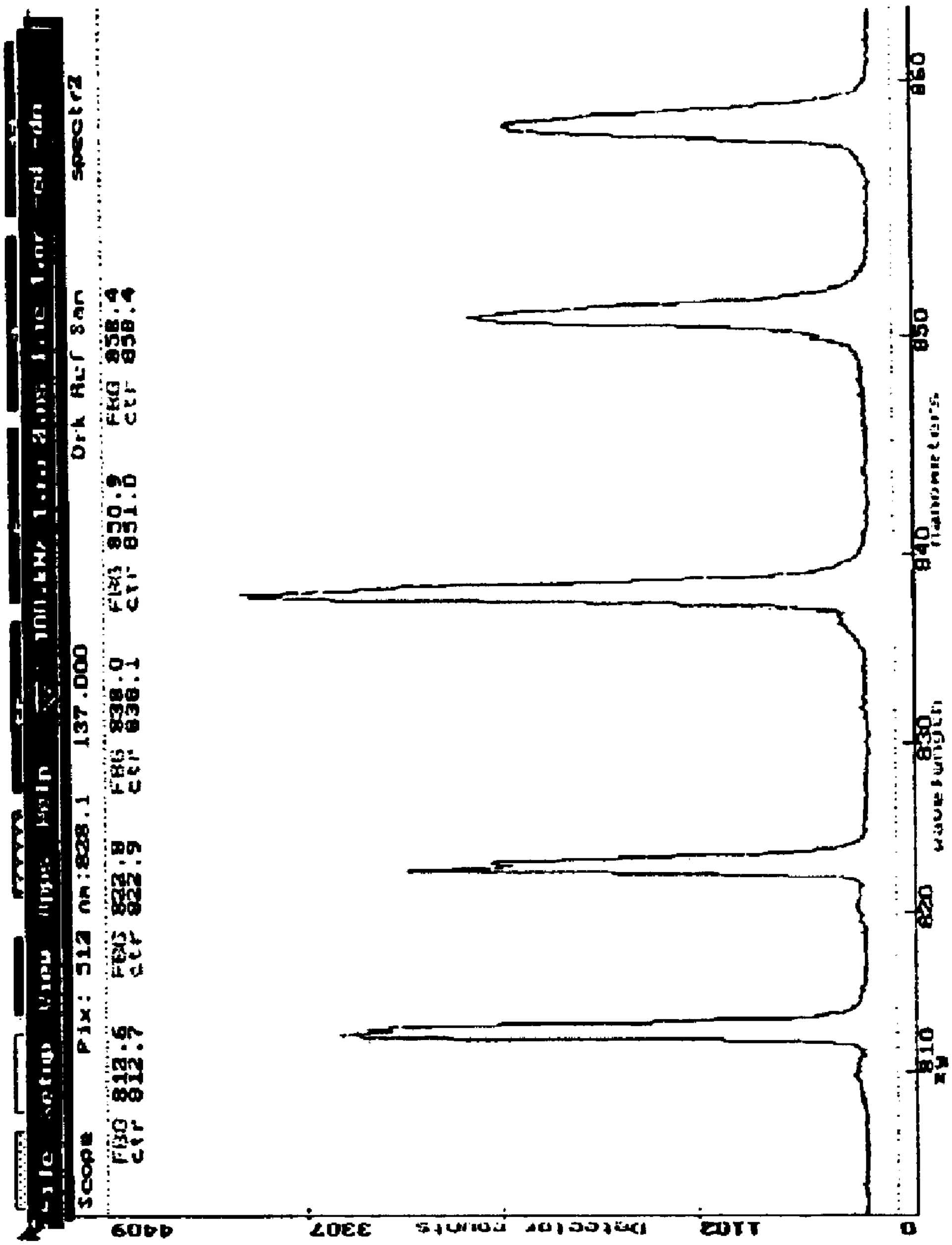
FIG. 31 illustrates that multiple FOBG temperature sensors are possible using one spectrometer, thus reducing overall costs (image courtesy StellarNet, Inc.)

Cascading several FOBGs and using one spectrometer is possible. For example, at least five FOBGs may be cascaded to one spectrometer, and more are possible depending upon the ruling of the gratings (how narrow they are), and how much movement they are expected to undergo. FIG. 31 shows the effect of cascading five FOBGs on one fiber optic line. In order to use a cascaded FOBG string as temperature sensors, the peaks of each FOBG must be tracked and the value compared to normal operating conditions. If the value is outside of normal range, the fault signal would be tripped and the inverter would be shut down. According to certain embodiments, at least four FOBG sensors may be implemented per phase leg, ensuring that each switch is independently monitored, thereby increasing system reliability.

Conditioning Circuits

The conditioning circuits may convert the optical sensor signals into the analog signal levels necessary for analog-to-digital (A/D) conversion and subsequent processing by the DSP. Arguably, with respect to closed-loop system operation, this may be the most critical control input within the entire inverter system. Phenomena such as DC drift, noise, and bandwidth are critical components in on the closed-loop control and operation of the inverter. For proper AC operation, noise and bandwidth may be considered to be of utmost importance, whereas for proper DC operation, noise and drift may be the governing parameters.

DC drift in the DC sensor circuit may result in measurement error and potential control overvoltage or under voltage conditions.

One of the challenges encountered in certain embodiments of the present invention involved the limitations of the A/D converters and filter functions, and the implications these blocks had on the conditioning system. The system may use 12-bit A/D converters with a full-scale input range of +/−1 v, resulting in a sampling bit level q of 488 $\mu$V. The quantization error of each sample, is normally assumed to random, uncorrelated, and uniformly distributed in the interval +/−q/2 with zero mean. In this case, the standard deviation (RMS value of the quantization noise in the measurement bandwidth [DC to one-half the Nyquist frequency]), also known as the measurement uncertainty, is given by $$\sigma_s = \sqrt{\frac{q^2}{12}} \tag{3}$$

For a 12-bit A/D system, this reveals a RMS measurement uncertainty of about 141 $\mu$V. If the A/D system resolution is fully used, the noise in the measurement bandwidth is desirably less than this value.

When designing the conditioning filters, it is useful to convert this measurement uncertainty value to a decibel level. Doing so is straightforward and for an input range of +/−1 v into 12 bits, we have $$Q_{RMS} = -20\log\left(\frac{Vpp}{\sigma_s}\right) = -83\ \text{dB} \tag{4}$$

Hence, given an A/D with a fixed number of bits and a maximum full-scale input restriction to that A/D, we now have a "best case" for what the system may provide in terms of performance. So that the A/D becomes the limiting factor in the system, we want all other components "upstream" of the A/D to have at least a dynamic range of the calculated $Q_{rms}$ level.

Figure 32:
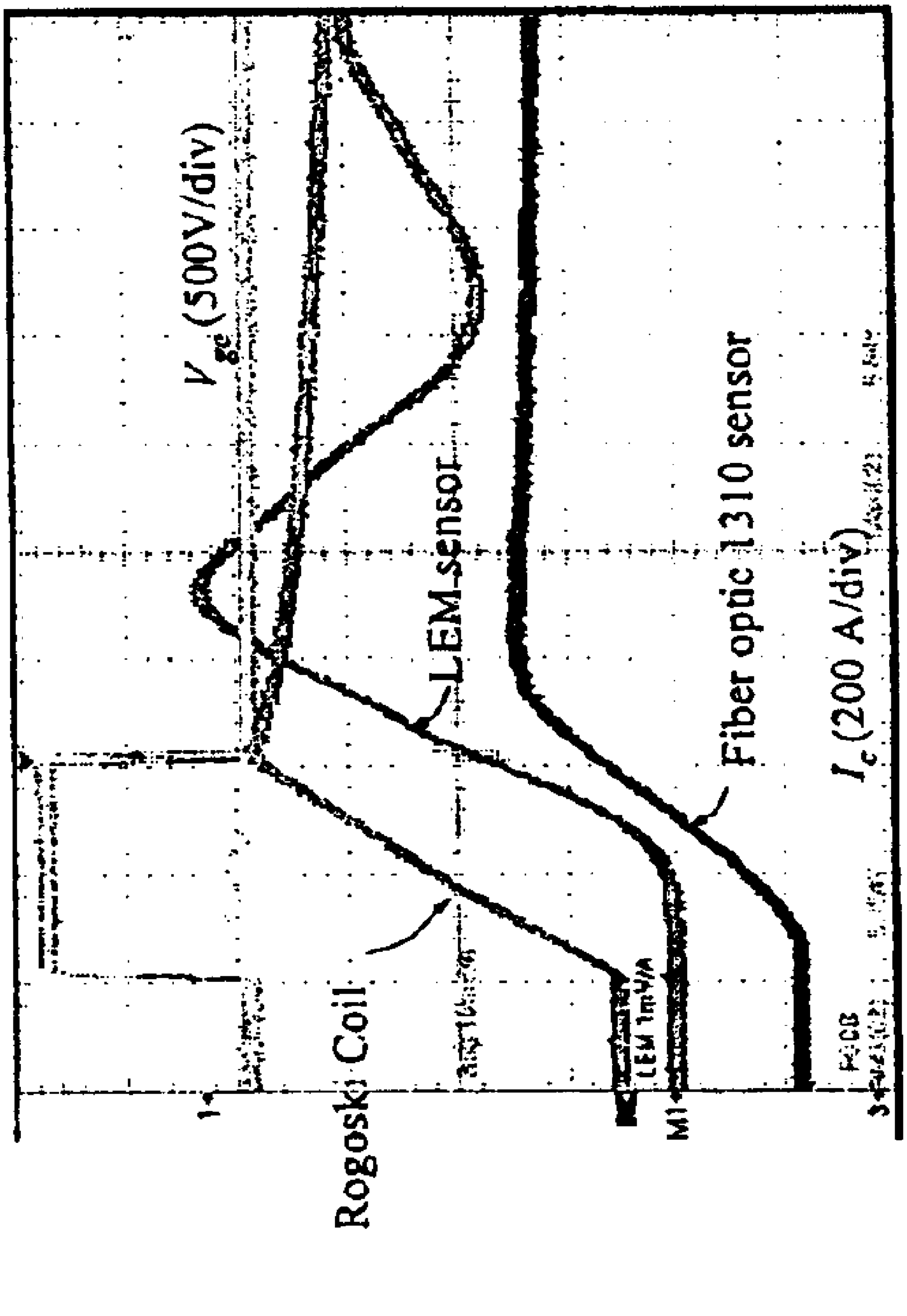
FIG. 32 illustrates waveforms showing the phase delay created by the combination of sensor and signal conditioning bandwidth limitations (The time base is 400 $\mu$sec per division.)

In addition to the sensor bandwidth limitations, the bandwidth of the conditioning system also has a dramatic impact on the phase response within the system. When coupled with the finite sensor bandwidth, the phase delay introduced into the system may greatly affect the control-loop. FIG. 32 illustrates the point.

Shown is the temporal response of three different sensor topologies: a Rogowski coil, which is shown in cyan and is the second trace from the top, a LEM CT, which is shown in green and is the third trace from the top, and Airak's fiber optic current sensor (FOCS), which is shown in magenta and is the bottom trace. The top trace, in yellow, is the voltage across one of the switches. All three sensors were monitoring the load current (approximately 700 A).

According to the specifications listed on the Rogowski coil, it has a measurement bandwidth of 1 MHz. The LEM CTs have a frequency bandwidth of 150 kHz but the signal conditioning circuits associated with the LEM transducers limited this to about 30 kHz. The Airak FOCS is limited only by its associated signal conditioning circuits (the sensor element has a bandwidth in excess of 700 MHz) and is approximately 250 kHz.

As can be seen in FIG. 32, the Rogowski coil shows the closest temporal correlation to the switching device, resulting in minimal phase delay. The LEM sensor/signal conditioning system shows the worse performance, exhibiting maximum phase delay (in excess of 400 $\mu$sec) as well as tremendous ringing of the measured current waveform. Also note that the LEM sensor picked up the radiated energy from the turn-off waveform—the Airak FOCS sensor (co-located with the LEM) did not see this noise due to its intrinsic noise immunity. The Rogowski coil was physically positioned far enough away that it did not detect the event. The Airak FOCS shows excellent amplitude response when compared to expected values and the Rogowski waveform and only about 40 $\mu$sec phase delay.

The conditioning system filter bandwidth and stop-band attenuation may be optimally designed in the context of the A/D input requirements and control system phase delay tolerances.

Data Acquisition and Digital Signal Processing

According to other embodiments of the present invention wherein the support electronics is created, a platform is developed that can support both the requirements of the optical system, as well as the gate drive control requirements of the DERSS testbed Requirements.

According to certain embodiments, the gate drive electronics can be driven with a control loop operating anywhere between 1 kHz to 8 kHz. At the higher frequency, the period is 12.5 μsec. To ensure control loop stability (adequate phase margin), a minimum 1.25 μsec update rate from the control system is favorable. Correspondingly, the control system processor preferably completes all calculations within this cycle time.

According to certain embodiments, a DSP card is used. This DSP card may be from Texas Instruments based upon the TMS 320C 6711, a floating point DSP that operates at a minimum clock frequency of 200 MHz. This DSP card may be interfaced to an integrated 16-channel, 12-bit A/D card that also contained a Xilinx FPGA for digital input/output purposes. This entire system may be supported by a PC running Windows™ NT environment.

According to certain embodiments, a 5-MW inverter is not operated using Windows™. Instead, a stand-alone DSP card based upon the software and hardware of certain embodiments may be developed. This embedded DSP controller may leverage from the software and firmware code developed according to certain embodiments to realize a system controller that is simpler, more robust, lower cost, and that may be scalable for manufacturing. According to certain embodiments, three DSP cards, interconnected through an interprocess communications protocol, can perform each phase leg's required functions while monitoring the other two DSPs for fault or other abnormal behavior.

Crystal Manufacture and Development

There exist four parameters that are preferrably characterized in the development and optimization of crystal compositions, all with respect to the following parameters: thickness (t), hysteresis, wavelength (λ), and dopant levels (x,y). The preferrably characterized parameters are:

Faraday or Pockels Rotation θ,

Absorption α, and

Temperature Stability (T)

To accomplish this, baseline results may be established, then specific modifications to the composition and/or manufacturing process may be undertaken with respect to polarization rotation, absorption, and temperature stability. The following is a brief synopsis of the state-of-the-art with respect to crystal growth in this area and how certain embodiments of the present invention advance the technology to produce optimized sensor elements.

Increasing Rotation. Increasing rotation per unit thickness increases sensor element sensitivity, and therefore permits thinner sensor elements. This implies lower absorption, which lowers the requirement for high-power laser diodes.

Various researchers have demonstrated that the (bismuth) $Bi^{3+}$ ion considerably increases the polarization rotation of rare earth iron garnets in the near infrared and visible region. The polarization rotation in the near infrared region is about one order of magnitude larger than that of pure $Y_3Fe_5O_{12}$ (YIG). It has been also demonstrated that the larger the lattice constant of the substrate, the greater the amount of bismuth that can be incorporated into the film (this is due to the large size of the bismuth ion). The upper limit of bismuth incorporation in the garnet structure is believed to be approximately $(RE_{1.8}Bi_{1.2})(GaFe)_5O_{12}$. By using larger lattice constant substrates such as $Gd_{2.68}Ca_{0.32}Ga_{4.02}Mg_{0.33}Zr_{0.65}O_{12}$ (CMZGGG, $a_0$=12.495A), a larger amount of bismuth can be incorporated, hence increasing polarization rotation per unit thickness.

In addition to changing the substrate, it has been found that the rotation rate of the substrate during the growth process changes not only the crystal growth rate, but also the kinetics of Bi incorporation. A rotation rate of about 60 rpm (with rotation reversal every cycle) is advantageous for growing the film composition $(Bi_{1.2}Tb_{1.8})(Fe_{4.6}Ga_{0.4})O_{12}$. Further, a reduction in the rotation rate to about 8 rpm changes the film composition to $(Bi_{1.1}Tb_{1.9})(Fe_{4.6}Ga_{0.4})O_{12}$.

Another way to change Bi incorporation is to vary the supercooling temperature ΔT. Empirically, a good linear correlation between number of incorporated bismuth atoms, u, and ΔT was found for the films with the general composition $(Gd_{3-u}Bi_u)(Fe_{5-x-y}Ga_xAl_y)O_{12}$:

$$du/dT=0.00423+0.0128u_0 \tag{5}$$

where $u_0$ is number of Bi atoms incorporated per formula unit at zero supercooling.

Therefore, through changing the rotation rate and manipulating the supercooling temperature, influences Bi dopant levels and thus, maximizes the polarization rotation.

Decreasing Absorption. Higher absoprtion levels require more optical power, which drives system costs higher.

The $Fe^{3+}$ absorption near 940 nm in YIG (lattice parameter 1.2382 nm) results from the $^6A_{1g}$ to $^4T_{1g}$ crystal field transition. This was long considered an immutable limitation on performance of YIG near 1000 nm. However, examination of the data of Wood and Remeika shows that the position of this peak shifts through the series of pure rare earth iron garnets, moving to lower wavelengths as the lattice parameter increases. Materials with a lattice parameter of 12.498 A have an absorption peak at 905 nm. Kawai et al. recently developed a substrate material $(Nd_{1.21}Gd_{1.74}Sc_{2.07}Ga_{2.98}O_{12})$ and a film composition $(Bi_{1.31}Nd_{1.69}Fe_5O_{12})$ to take advantage of this effect and shift the peak further to ~880 nm. This lowered the insertion loss at 980 nm by 57% to 2.6 dB and at 1017 mm by 71% to 1 dB, making workable devices at these wavelengths for some applications a possibility. They have also increased the Bi content. Unfortunately, there is likely to be a limit for this approach because further increases in the lattice parameter run into practical limits of phase stability, and increases in the Bi content cause an increase in the thermal expansion mismatch between the film and substrate, resulting in the rapid proliferation of misfit dislocation defects.

Wood and Remeika also identified the rare earth absorption peaks for all of the iron garnets. Terbium (Tb), which has become the rare earth atom of choice because it reduces the temperature dependence, initially appeared to have no absorption at 1310 and 1550 nm. However, now that insertion losses have been reduced to intrinsic levels, it can be seen that Tb absorption peaks near 1800 nm have a small tail that extends into the telecommunications 1550 nm window, producing an insertion loss of approximately 0.02 dB per formula unit of Tb. To achieve minimum absorption of <0.02 dB, a Tb-free composition is required, which results in a tradeoff with temperature dependence.

Considerable optical absorption (α) is observed in the near-infrared spectral region in Bi-substituted magnetic garnets because of $Fe^{2+}$ ions are produced according to the equation $Fe^{2+}$=$Pt^{4+}$+2($O^{2-}$ vacancy). Platinum ions from the Pt crucible always exist in the melt and can be incorporated into a film. In order to eliminate $Fe^{2+}$ ions it is important to dope divalent ions, which work as acceptors. It turns out that the optical absorption caused by $Fe^{2+}$ ions could be completely eliminated by doping with $Mg^{2+}$ according to the equation $Mg^{2+}$=$Pt^{4+}$+2($O_{2-}$ vacancy).

H. Tamada et al. tried to reduce α to the same level as that which exists when incorporating a proper amount of Mg by decreasing oxygen vacancies using ozone for a heat treatment (referred to as $O_3$ annealing) instead of oxygen. They were able to drastically reduce the optical absorption of $(BiYGd)_3(FeGa)_5O_{12}$ film in the region 0.7–2.6 μm by 03 annealing films for 3 hours at a temperature of 700° C. According to certain embodiments of the present invention, this approach is used to reduce optical absorption.

Decrease Temperature Sensitivity. Non-zero temperature sensitivity restricts absolute accuracy.

The optical sensors preferably operate over a specified temperature range with negligible drift. Unfortunately, the polarization rotation of the rare-earth iron garnets is not constant over this temperature range. The temperature coefficient of polarization rotation in bismuth-doped compositions is typically 0.06 to 0.08 degree/° C. compared to 0.04 degree/° C. in YIG.

The polarization rotation of an iron garnet is given by $$\Theta_F = C(\lambda)M_c(T) + D(\lambda)M_d(T) + A(\lambda)M_a(T) \quad (6)$$

where C(λ), D(λ) and A(λ) are the wavelength-dependent magneto-optic coefficients, respectively, of the c (dodecahedral), d (tetrahedral) and a (octahedral) sublattices. These coefficients contain a small magnetic term and an electric dipole term that is significantly affected by Bi substitution through superexchange and spin-orbit interactions. $M_c(T)$, $M_d(T)$, and $M_a(T)$ are temperature-dependent saturation magnetizations of the sublattices. The first idea for decreasing the high temperature dependence of the Bi-induced polarization rotation is to adjust the rest of the constituents of the garnet to compensate for the large temperature dependence of the Bi-induced component. However, the Bi-induced component is so strong that the other constituents have only a minor effect. The one additive atom that makes a slight difference is Tb (terbium). The heavy rare earths such as Tb have their magnetic moment aligned antiferromagnetically to the net iron lattice moment, with a weak coupling to the iron sublattices (d and a) that causes the c sublattice magnetization to vary sharply, approximately as 1/T. This results in a large negative temperature coefficient of $M_c(T)$ in the region of interest. Tb is an unusual element, as it has a large negative C(λ), so the coupling of the c lattice magnetization to the polarization rotation is significant. The entire polarization rotation of the terbium iron garnet (TbIG) arises from the c lattice contribution. TbIG has both a polarization rotation of opposite sign to that of the heavily Bi-doped iron garnets and high temperature dependence. When these two effects are combined, the Tb incorporation reduces the net polarization rotation, but more so at low temperatures, reducing the effective temperature coefficient of the polarization rotation in the material. The temperature coefficient of the polarization rotation is dependent on the ratio of Bi to Tb. It is possible to obtain a material with zero temperature coefficient, but it requires a low Bi concentration and hence results in a low specific polarization rotation.

Taking into account these results, according to certain embodiments of the present invention, compositions of $(BiTb)_3(FeGa)_5O_3$ are grown in order to optimize the Bi/Tb ratio and obtain a reduction in the temperature coefficient as compared to compositions with no Tb.

DER Simulator Topology, Algorithm Development, and Modeling/Testing

Certain embodiments of the present invention establish the foundation of the entire DERSS so that other embodiments can converge with the AC-DC converter being co-developed by AEP.

Figure 33:
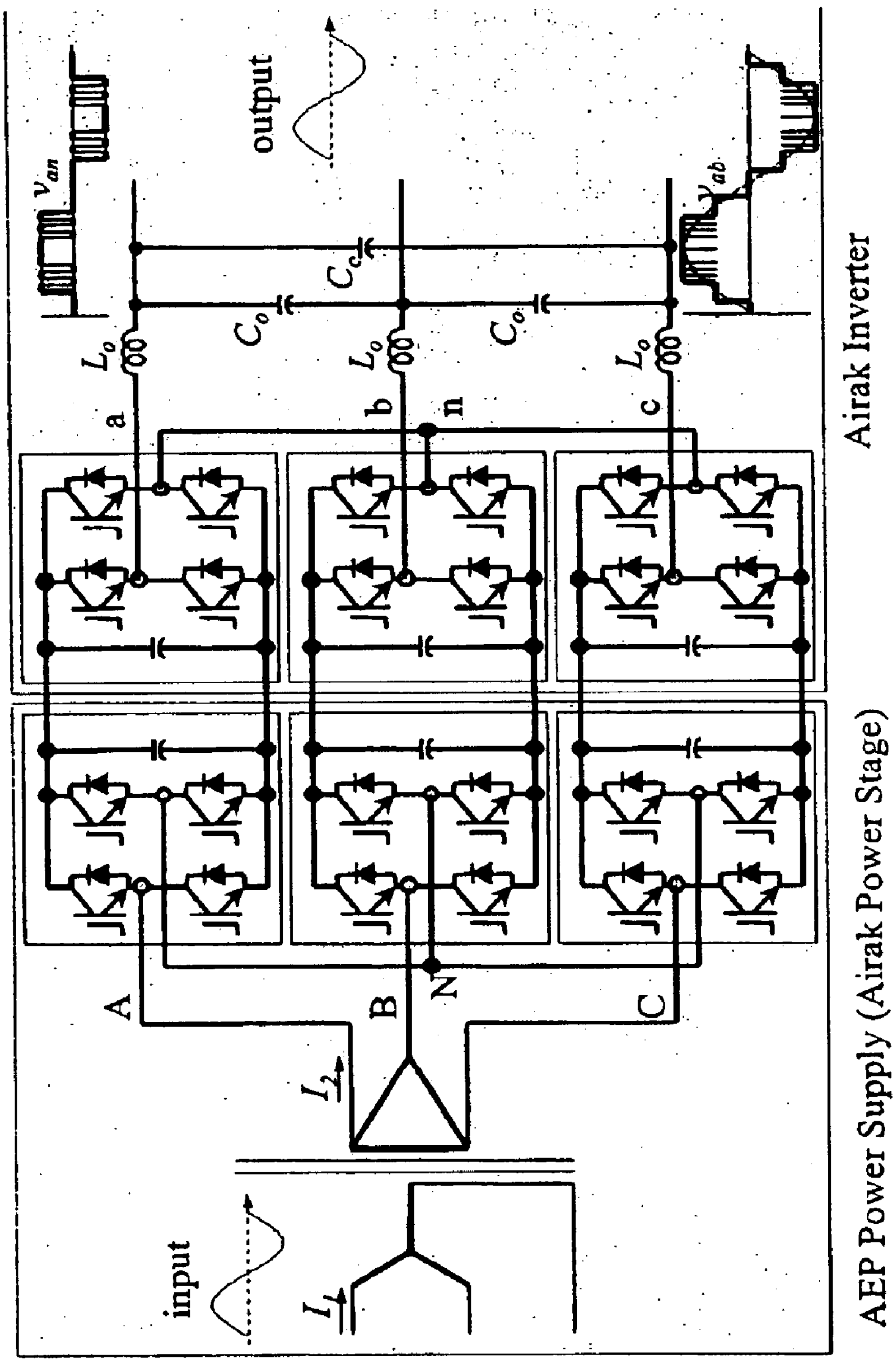
FIG. 33 illustrates a back-to-back multilevel cascade inverter system that includes the core components of the DERSS.

A back-to-back intertie multilevel converter system may be used to test inverters according to certain embodiments of the present invention with the utility line supply and available DER sources. For a three-phase multilevel megawatt inverter, it is difficult to find a standalone voltage source to supply the inverter. If the power stage can be mirrored and used as an AC-DC converter to provide a DC source to the inverter, then the entire unit can be tested with the utility line source or DER source supplying a standalone load. FIG. 33 shows a back-to-back intertie multilevel converter system. The core power electronics technology is the multi MW HV-IGBT inverter design. This configuration can be applied to many utility applications. Examples are (1) back-to-back intertie for two different dynamic power systems, (2) intertie for two different frequency systems, (3) universal power flow control, and (4) uninterruptible power supply with variable speed generator sources such as micro-turbines and wind turbines.

Front-End AC-DC Converter

Figure 34:
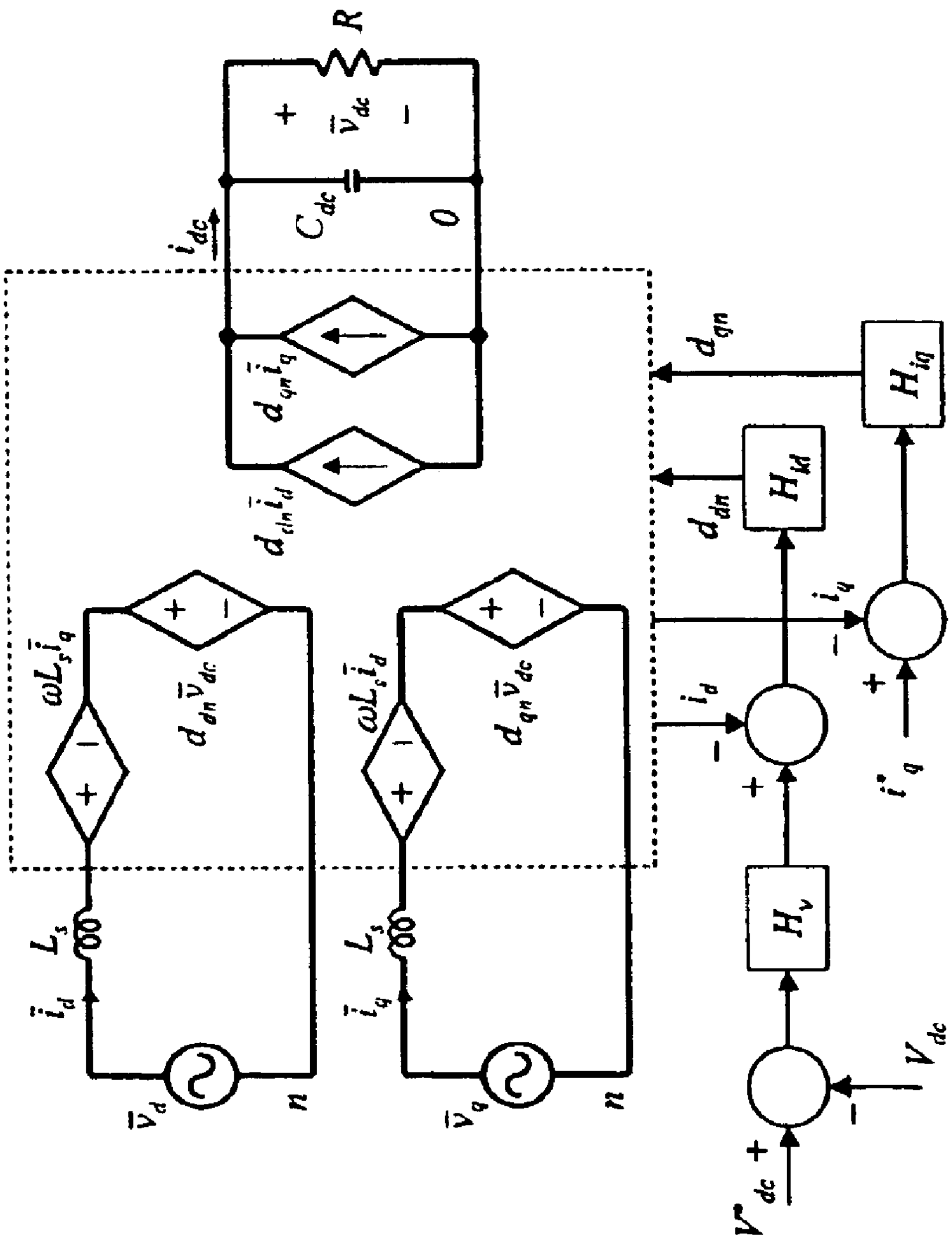
FIG. 34 illustrates a closed-loop control system of the active front end (AFE) AC-DC multilevel converter.

The front-end AC-DC converter in FIG. 33 contains a standard isolation transformer, which can be configured with different Y and Δ combinations. With Y-Δ configuration, it is easier to drop the high voltage to low voltage. However, if the DER source voltage is lower than the dc link voltage, the configuration should be changed to Δ-Y for a better transformer turns ratio design. The three-phase voltages are supplied to three full-bridge converters, which in this case can be considered as the boost converter, and through proper control, the input current waveform can be easily controlled, producing a clean sinusoid without harmonic distortions that are normally seen in a pure rectifier bridge circuit. Harmonic elimination with such an active front-end (AFE) is called "power factor correction" in the power supply industry. The control for the AFE can be implemented with voltage and current phase alignment or with dq-transformation for additional compensation for reactive circuit components. FIG. 34 shows the block diagram of the control system for the AFE. The DC bus voltage is controlled by the d-axis component, and the reactive component is controlled by the q-axis component. If the unity power factor is desired, the q-axis reference, $i^*_q$, should be set to zero. The voltage loop controller, $H_v$, is normally designed to have lower bandwidth because the DC bus voltage does not need to change too fast. The current loop controllers, $H_{id}$ and $H_{iq}$, however, generally need fast current loop response times. Through inverse transformation, the d-axis and q-axis voltages and currents can be converted back to three-phase voltage and current components.

Figure 35:
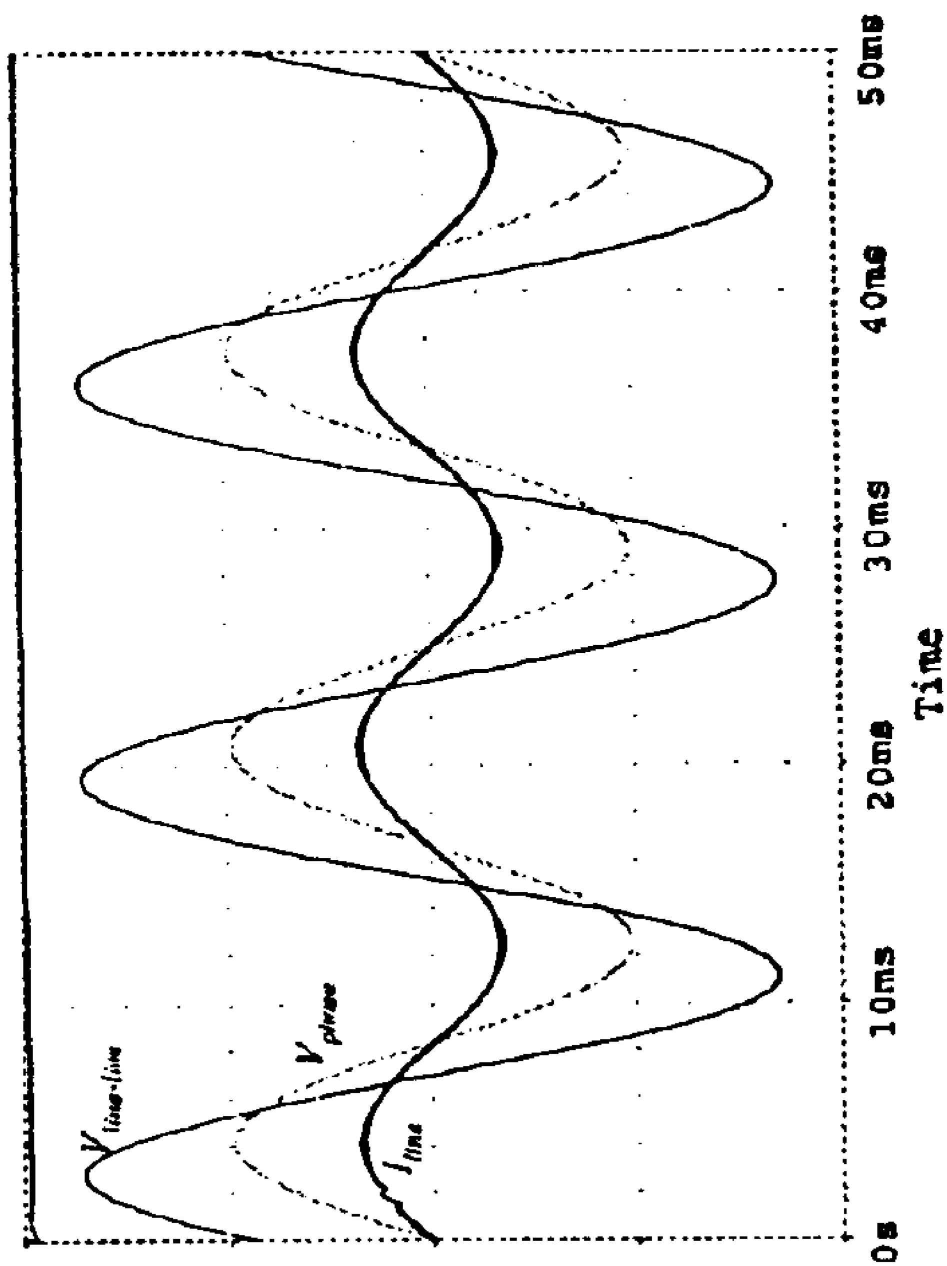
FIG. 35 illustrates simulated voltage and current time domain responses.

With the control system described in FIG. 34, the simulated input voltage and current waveforms can be shown in FIG. 35. The line current is in phase with the phase voltage, while the line-to-line voltage is leading the phase voltage by 30°. The line current presents some high frequency switching ripple. This ripple can be reduced by either a larger inductance between the converter and source or a higher switching frequency.

Three-level Cascaded DC-AC Inverter

Figure 36:
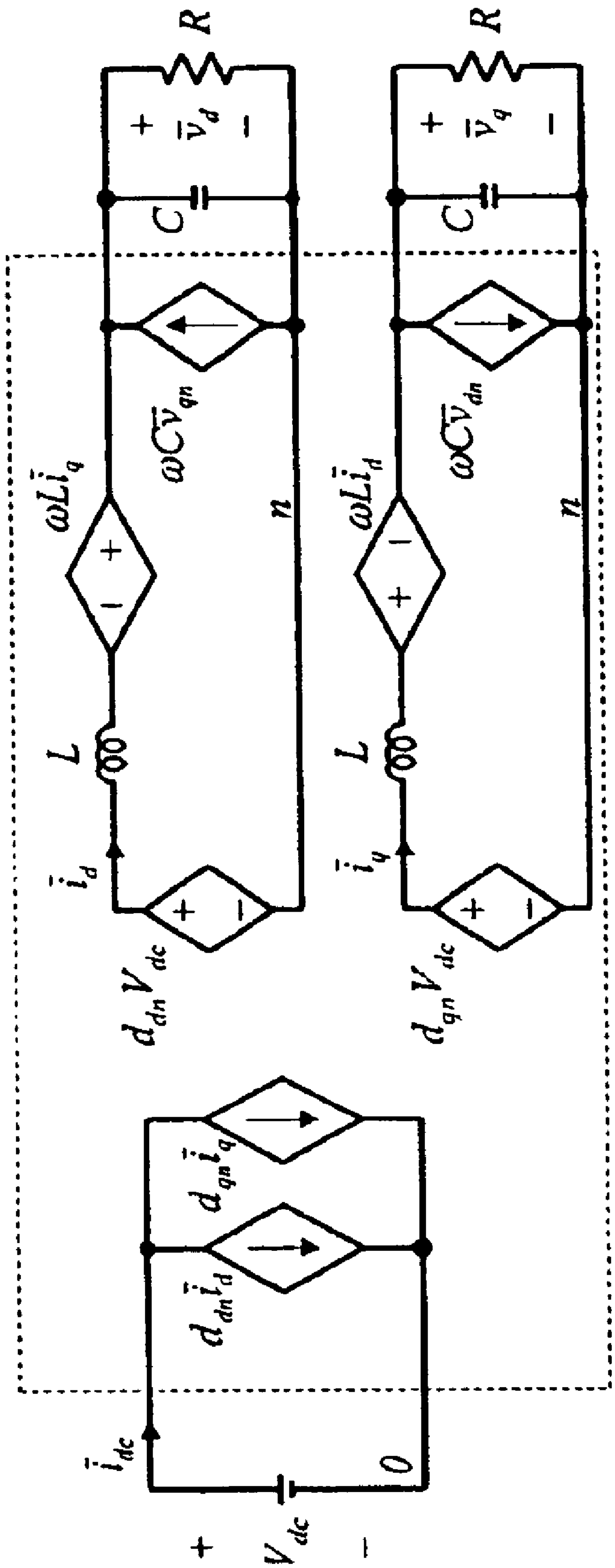
FIG. 36 illustrates a DC-AC inverter model in dq-domain.

The inverter side circuit generally has the same power stage, however, for three-phase AC loads, the output passes through passive LC filters. Final specifications of the output voltage and power levels may be determined through discussion. The filter design can be a major challenge because if the switching frequency is not high enough, the filter frequency may need to be low, resulting in interference with the nonlinear loads and perhaps resonance with the system impedance. After filter LC components are designed, the DC-AC inverter can then be modeled in dq-domain for controller design. FIG. 36 shows the dq-domain circuit model of the DC-AC inverter. The dynamic response is dominated by the LC components and the control parameters: duty cycles in both d-axis and q-axis, i.e., $d_{dn}$ and $d_{qn}$. The d-axis and q-axis duty cycles can be converted back to abc-domain for three-phase voltage control.

The control system of the DC-AC inverter may be similar to that of the active-front-end AC-DC converter. The only difference may be the control parameter. In the AC-DC converter, the control targets may be the d-axis and q-axis currents. In the DC-AC inverter, the control targets may be the d-axis and q-axis voltages. If the load is passive, q-axis voltage is preferably zero. However, if the load is active or as in an intertie system, the q-axis voltage can be controlled so that the power angle or power flow can be controlled accordingly.

Inverter Subsystems Integration and Testing

The optoelectronics, DSP subsystems, and the inverter hardware may all be brought together. This integration is considered the primary software integration where each component is tested, characterized, and functionality validated. The preliminary sequence of events is Verify that the self-test and protection systems are operational.

Verify correct, low-power open loop operation.

Verify correct, low-power closed-loop operation.

Verify correct, high-power closed-loop operation.

The test source may be an off-the-shelf high-voltage dc power supply with rating higher than 2 kV and 60 kW. This will allow the three-phase inverter to be tested with pure inductive load to full voltage and current. The 5 -MW system with 50 -kW loss means 99% efficiency. Although certain embodiments may reach 99.5% efficiency with 25 -kW total inverter loss, the power source should preferably be able to provide sufficient margin for higher load and loss conditions. The inductive load testing may not reflect true system efficiency and thermal condition; however, with our well-established inverter models, we can predict the system losses and efficiency under different power factor conditions based on the information obtained from the inductive load testing.

Inverter Performance Analysis

All protection systems and overall performance can be tested. The inverter subsystem performance results may be used to determine system control strategy. For example, very important information in the system control level is how high does the voltage peak under load shedding conditions. Te protection trip points for abnormal voltage, current, and temperature also should preferably be determined and fine-tuned during the integration and test. Device junction temperature can be projected with loss analysis and heatsink temperature conditions. Sufficient device operation margins may be determined accordingly.

DERSS Converter—Inverter Integration & Preliminary Testing

The integrated converter-inverter may be tested at full power condition with passive reactive and real loads. The performance under low-load condition may be compared with predicted results to ensure inverter is capable of operating under full-load condition.

DERSS Performance Analysis

Performance validation of the DERSS may be done. Specifically, this task may be the final acceptance testing for subsequent deployment of the DERSS into an ctrical power distribution system.

The performance of entire DERSS including AC-DC converter and DC-AC inverter under normal and abnormal operations may be evaluated. Some well-known IEEE standards such as IEEE-519 and IEEE-1547 may be adopted in the performance evaluation. Optional control functions such as power flow control and reactive power compensation may also be evaluated to demonstrate the versatility of the proposed system.

Additional Embodiments

Figure 37:
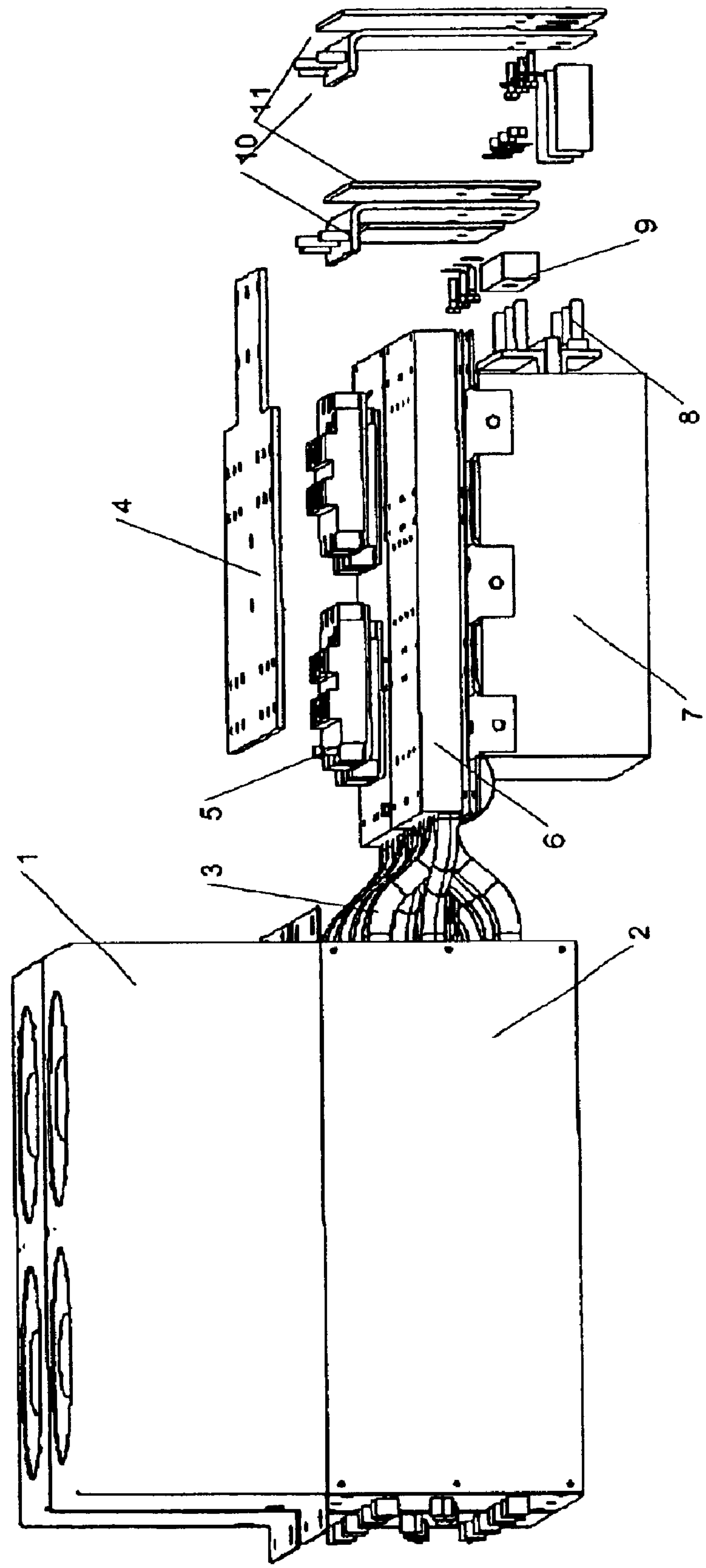
FIG. 37 illustrates an exploded view of modular power converter non-optical components.

FIG. 37 illustrates an exploded view of modular power converter non-optical components. In FIG. 37, the components shown include a cooling fan assembly 1, cooling fins 2, heat pipes 3, a planar bus bar 4, insulated gate bipolar transistors (IGBTs) 5, a modified copper heat block 6, a bus capacitor 7, bus capacitor terminals 8, interconnecting hardware 9, copper interconnection straps 10, and a strap insulating material 11.

The major mechanical and power electronic components of a single-phase leg of the modular power converter are shown in the exploded view of FIG. 37. The view has been rotated 90 degrees clockwise to accommodate it on the page. Three such systems comprise a three-phase converter. The active devices in the system are, in one preferred embodiment, insulated gate bipolar transistors (IGBTs) (5), which are mounted on a modified copper heat block (6). Any active device, such as IGCTs, MOSFETs, etc. could be used in place of the IGBTs without changing the spirit or functionality of the system. A means for controlling the IGBTs is provided by an optical gate interface (not shown), which may be connected to a separate control function (not shown) and the IGBTs (5). Multiple IGBT devices may be interconnected to each other and to a bus capacitor (7) through bus capacitor terminals (8) and a planar bus bar (4). The planar bus bar also serves as a low-inductance element within the circuit, which removes the need for external inductive components, thus simplifying the design.

The cooling system for the modular power converter phase leg is completely self-contained and requires no outside interconnection for circulatory water or equivalent heat removal media. This serves the function of lowering system maintenance costs as well as improving system reliability. Heat generated by the IGBTs is radiated through the modified copper heat block (6) and heats a cooling solution contained in multiple heat pipes (3). Copper is used as the heat block component but any low-thermal-resistance material could be used without changing the overall function of the system. When oriented in the vertical direction, the contained cooling solution evaporates and rises up the heat pipes into the cooling fin assembly (2). Cooling fan assembly (1) blows ambient air across heat pipes, cooling the internal cooling solution, causing it to fall back into the modified copper heat block (6).

Figure 38:
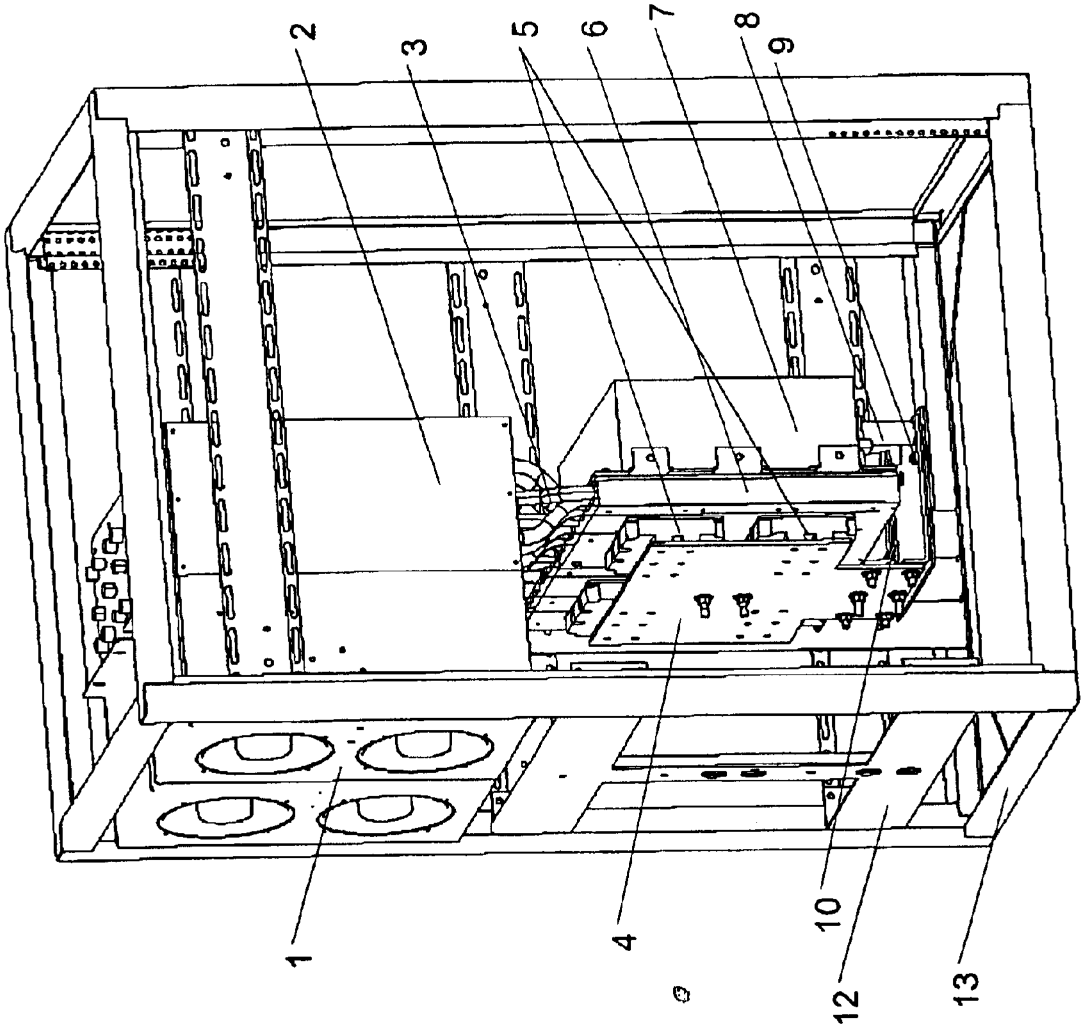
FIG. 38 illustrates an operational view of modular power converter non-optical components.

FIG. 38 illustrates an operational view of modular power converter non-optical components. The components include a cooling fan assembly 1, cooling fins 2, heat pipes 3, a planar bus bar 4, insulated gate bipolar transistors (IGBTs) 5, a modified copper heat block 6, a bus capacitor 7, bus capacitor terminals 8, interconnecting hardware 9, copper interconnection straps 10, an interconnecting cable guide support 12, and a support chassis 13.

The major mechanical and power electronic components of a single-phase leg of the modular power converter are shown in FIG. 38. Three of these single-phase legs comprise a three-phase power converter. The numbering is the same as the previous figure. Additional items that are shown are the interconnecting cable guide support (12), which serves the purpose of connecting and strain relieving the AC and DC cables within the system, and the support chassis (13), which retains the entire phase leg assembly.

Among the unique attributes of the modular power converter are that the high voltage, high current power stage is completely isolated from the low-voltage, low-current control system through the use of fiber optic communications and fiber optic sensing. Another unique attribute is that the use of optical current, voltage and temperature transducers to monitor the active power stage provides for a high-bandwidth, higher-reliability isolated measurement system not found in any other commercially available power stage. Yet another unique attribute is that the use of optical communications between the control system and the active power stage provides for a high isolation communications interface that increases personnel and equipment safety while improving overall reliability. Further, the use of a self-contained cooling solution from ThermaCore (1) (2) (3) (6) provides for a compact unit with improved reliability of the overall system through a reduced number of moving parts. Even further, the use of four fans (two per cooling fan assembly (1)) provides for the ability to operate the unit in degraded mode of operation in the event of the failure of one of the fans. Also, the planar bus bar provides a for a low inductance interconnection system which simplifies the overall system structure.

It should be noted that a basic system typically consists of a high power stage (either high current and/or high voltage), a low-voltage control stage, optical communications links, self-contained cooling solutions such as the ThermaCore system that has been designed and implemented, and optical sensor links comprising any or all of the following: optical temperature, optical current, and optical voltage sensors.

The foregoing description and drawings merely explain and illustrate the invention, and the invention is not limited except insofar as the appended claims are so limited, as those skilled in the art who have the disclosure before them will be able to make modifications and variations therein without departing from the scope of the invention.

What is claimed is:

1. An optically isolated power electronic power conversion circuit comprising:

an input electrical power source;

a power electronic switch;

a means for connecting said switch to said input power source, said means for connecting comprising an interconnecting cable and/or bus bar;

an optically isolated drive circuit operatively connected to said switch;

a heat sink assembly;

an output load;

means for connecting said switch to said output load comprising at least one interconnecting cable and/or bus bar; and, at least one optical sensor for sensing conditions in a high-power stage of the converter.

2. The optically isolated power electronic power conversion circuit of claim 1, wherein said at least one optical sensor comprises a fiber optic temperature sensor.

3. The optically isolated power electronic power conversion circuit of claim 2, wherein said fiber optic temperature sensor is mounted on said heat sink assembly.

4. The optically isolated power electronic power conversion circuit of claim 1, wherein said at least one optical sensor comprises a fiber optic current sensor.

5. The optically isolated power electronic power conversion circuit of claim 4, wherein said fiber optic current sensor is mounted on a load interconnection cable.

6. The optically isolated power electronic power conversion circuit of claim 4, wherein said fiber optic cuurent sensor is mounted on an output bus bar.

7. The optically isolated power electronic power conversion circuit of claim 4, wherein said fiber optic current sensor is mounted on an input bus bar.

8. The optically isolated power electronic power conversion circuit of claim 4, wherein said fiber optic current sensor is mounted on an input power interconnection cable.

9. The optically isolated power electronic power conversion circuit of claim 1, wherein said at least one optical sensor comprises a fiber optic voltage sensor.

10. The optically isolated power electronic power conversion circuit of claim 9, wherein said fiber optic voltage sensor is mounted on the load interconnection cable.

11. The optically isolated power electronic power conversion circuit of claim 9, wherein said fiber optic voltage sensor is mounted on the output bus bar.

12. The optically isolated power electronic power conversion circuit of claim 9, wherein said at fiber optic voltage sensor is mounted on an input power interconnection cable.

13. The optically isolated power electronic power conversion circuit of claim 9, wherein said at fiber optic voltage sensor is mounted on an input bus bar.

14. The optically isolated power electronic power conversion circuit of claim 1, further comprising a heat pipe.

15. The optically isolated power electronic power conversion circuit of claim 1, wherein said at least one power electronic switch comprises a plurality of interconnected power electronic switches.

16. The optically isolated power electronic power conversion circuit of claim 1, wherein said at least one power electronic switch is mounted upon said heat sink assembly.

17. The optically isolated power electronic power conversion circuit of claim 1, wherein said means for connecting said switch to said input power source comprises a plurality of interconnecting cables and/or input bus bars.

18. The optically isolated power electronic power conversion circuit of claim 1, wherein said means for connecting said switch to said output load comprises a plurality of interconnecting cables and/or output bus bars.

19. The optically isolated power electronic power conversion circuit of claim 1, wherein the power conversion circuit is a power inverter.

20. The optically isolated power electronic power conversion circuit of claim 1, wherein the power conversion circuit is a rectifier.

* * * * *